US011651555B2

(12) United States Patent
Energin et al.

(10) Patent No.: US 11,651,555 B2
(45) Date of Patent: May 16, 2023

(54) RE-CREATION OF VIRTUAL ENVIRONMENT THROUGH A VIDEO CALL

(71) Applicant: MICROSOFT TECHNOLOGY LICENSING, LLC, Redmond, WA (US)

(72) Inventors: Semih Energin, Seattle, WA (US); Jeffrey Jesus Evertt, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 96 days.

(21) Appl. No.: 15/994,585

(22) Filed: May 31, 2018

(65) Prior Publication Data

US 2019/0371060 A1 Dec. 5, 2019

(51) Int. Cl.
*G06T 19/00* (2011.01)
*G06F 3/04815* (2022.01)
(Continued)

(52) U.S. Cl.
CPC ........ *G06T 19/003* (2013.01); *G06F 3/04815* (2013.01); *G06T 15/20* (2013.01);
(Continued)

(58) Field of Classification Search
CPC ....... G06T 19/003; G06T 17/05; G06T 15/20; G06T 19/006; G06T 17/20; G06F 3/04815; H04N 7/157; H04N 7/147
See application file for complete search history.

(56) References Cited

U.S. PATENT DOCUMENTS 8,675,067 B2 3/2014 Chou et al.
9,047,698 B2 6/2015 Maciocci et al.
(Continued)

FOREIGN PATENT DOCUMENTS

WO 2017030985 A1 2/2017
WO 2017172528 A1 10/2017

OTHER PUBLICATIONS

Kauff, et al., "An Immersive 3D Video-Conferencing System Using Shared Virtual Team User Environments", In Proceedings of the 4th International Conference on Collaborative Virtual Environments, Sep. 30, 2002, pp. 105-112.
(Continued)

*Primary Examiner* — Chante E Harrison
(74) *Attorney, Agent, or Firm* — Newport IP, LLC; Benjamin A. Keim

(57) ABSTRACT

An improved human-computer interface ("HCI") is disclosed herein for viewing a three-dimensional ("3D") representation of a real-world environment from different, changing, and/or multiple perspectives. An AR device may capture, in real-time, a 3D representation of a scene using a surface reconstruction ("SR") camera and a traditional Red Green & Blue ("RGB") camera. The 3D representation may be transmitted to and viewed on a user's computing device, enabling the user to navigate the 3D representation. The user may view the 3D representation in a free-third-person mode, enabling the user to virtually walk or fly through the representation captured by the AR device. The user may also select a floor plan mode for a top-down or isomorphic perspective. Enabling a user to view a scene from different perspectives enhances understanding, speeds trouble-shooting, and fundamentally improves the capability of the computing device, the AR device, and the combination thereof.

17 Claims, 10 Drawing Sheets

(51) Int. Cl.
  *G06T 17/05* (2011.01)
  *G06T 17/20* (2006.01)
  *H04N 7/15* (2006.01)
  *G06T 15/20* (2011.01)

(52) U.S. Cl.
  CPC .............. *G06T 17/05* (2013.01); *G06T 17/20* (2013.01); *G06T 19/006* (2013.01); *H04N 7/157* (2013.01)

(56) References Cited

U.S. PATENT DOCUMENTS

| | | | |
|---|---|---|---|
| 9,524,588 B2 | 12/2016 | Barzuza et al. | |
| 9,849,384 B1 | 12/2017 | Energin | |
| 9,881,419 B1 * | 1/2018 | Cote | G06T 19/00 |
| 10,234,939 B2 * | 3/2019 | Miller | H04L 67/38 |
| 10,235,808 B2 * | 3/2019 | Chen | G06F 3/16 |
| 2004/0130614 A1 * | 7/2004 | Valliath | H04N 7/147 |
| | | | 348/14.08 |
| 2006/0132482 A1 * | 6/2006 | Oh | G06T 13/80 |
| | | | 345/419 |
| 2012/0249741 A1 * | 10/2012 | Maciocci | G06F 3/011 |
| | | | 348/46 |
| 2013/0050260 A1 * | 2/2013 | Reitan | G06F 3/011 |
| | | | 345/633 |
| 2013/0117377 A1 * | 5/2013 | Miller | H04L 67/38 |
| | | | 709/205 |
| 2013/0321564 A1 * | 12/2013 | Smith | H04N 13/117 |
| | | | 348/14.08 |
| 2015/0035823 A1 * | 2/2015 | Arsan | G06T 15/20 |
| | | | 345/419 |
| 2017/0127023 A1 * | 5/2017 | High | G06T 7/30 |
| 2017/0142480 A1 * | 5/2017 | Gupta et al. | G06Q 30/0273 |
| 2017/0302719 A1 * | 10/2017 | Chen | H04N 19/105 |
| 2017/0339372 A1 * | 11/2017 | Valli | H04N 7/157 |
| 2018/0122142 A1 * | 5/2018 | Egeler | G06F 16/5854 |
| 2018/0143756 A1 * | 5/2018 | Mildrew | G06F 3/011 |
| 2018/0144547 A1 * | 5/2018 | Shakib | G06T 15/503 |
| 2018/0197624 A1 * | 7/2018 | Robaina | A61B 90/37 |
| 2018/0255290 A1 * | 9/2018 | Holzer | H04N 13/221 |
| 2018/0333643 A1 * | 11/2018 | Luisi | G06T 7/73 |
| 2019/0088005 A1 * | 3/2019 | Lucas | G06T 15/205 |
| 2019/0107935 A1 * | 4/2019 | Spivack | G06Q 30/0273 |
| 2019/0108683 A1 * | 4/2019 | Valli | H04N 7/157 |
| 2019/0213423 A1 * | 7/2019 | Haberstroh | G06K 9/00671 |
| 2019/0253667 A1 * | 8/2019 | Valli | G02B 27/017 |
| 2019/0304188 A1 * | 10/2019 | Bridgeman | G09B 5/02 |
| 2019/0362312 A1 * | 11/2019 | Platt | G06Q 10/10 |
| 2020/0008024 A1 * | 1/2020 | Hu | G06T 7/73 |
| 2020/0342673 A1 * | 10/2020 | Lohr | G06T 19/006 |

OTHER PUBLICATIONS

Regenbrecht, et al., "Using Augmented Virtuality for Remote Collaboration", In Journal of Presence: Teleoperators & Virtual Environments, vol. 13, Issue 3, Jun. 2004, pp. 338-354.

"International Search Report and Written Opinion Issued in PCT Application No. PCT/US19/032551", dated Sep. 6, 2019, 21 Pages.

* cited by examiner

RE-CREATION OF VIRTUAL ENVIRONMENT THROUGH A VIDEO CALL

BACKGROUND

A networked meeting represents one popular form of electronic collaboration that facilitates communication between two or more participants present at separate physical locations. Participants of a communication session in a networked meeting are able to exchange live video, audio, and other types of content to view, hear, and otherwise share information. Participants can also view a common space, e.g., a whiteboard or a shared application, through which ideas can be exchanged. Viewing of the common space can be complemented with a video and audio conference, an instant messaging session, or any combination thereof, such that the networked meeting can act as a near substitute for an in-person meeting.

As networked meetings have become ubiquitous, the types of devices that can be used to participate in networked meetings has increased. While once limited to desktop and laptop computers, users can now participate in networked meetings using many other types of hardware devices including, but not limited to, smartphones, tablet computing devices, set-top boxes, smart televisions, video game systems, and even augmented reality ("AR"), virtual reality ("VR"), and mixed reality ("MR") devices.

When a participant utilizes an AR device to participate in a networked meeting, it is currently possible for the AR device to capture that participant's view of their surrounding environment and transmit images or video of the view to the other meeting participants. The other meeting participants can then be presented with the images or video of the real-world environment surrounding the user wearing the AR device. The other meeting participants might also be able to view any virtual objects that the AR device has overlaid upon the real-world environment.

Despite the benefits of the features described above, some systems have drawbacks. For example, the images or video of the real-world environment may be limited to a perspective of the AR device (also referred to as a 'pose' of the AR device). While the perspective may be changed, e.g. by the wearer of the AR device moving about or looking around, other meeting participants are then limited to the new perspective. It can be appreciated that there is an ongoing need to improve techniques for allowing users to efficiently view objects, real and virtual, from other perspectives.

It is with respect to these considerations and others that the disclosure made herein is presented.

SUMMARY

An improved human-computer interface ("HCI") is disclosed herein for viewing a three-dimensional ("3D") representation of a real-world environment from different, changing, and/or multiple perspectives. An AR device may capture, in real-time, a 3D representation of a scene using a surface reconstruction ("SR") camera and a traditional Red Green & Blue ("RGB") camera. The 3D representation may be transmitted to and viewed on a user's computing device, enabling the user to navigate the 3D representation. The user may view the 3D representation in a free-third-person mode, enabling the user to virtually walk or fly through the representation captured by the AR device. The user may also select a floor plan mode for a top-down or isomorphic perspective. Enabling a user to view a scene from different perspectives enhances understanding, speeds trouble-shooting, and fundamentally improves the capability of the computing device, the AR device, and the combination thereof.

In some embodiments, the computing device displaying the 3D representation may display multiple perspectives and/or multiple modes at the same time (e.g. third person, top-down, etc.). Multiple perspectives may be created by assigning virtual cameras to different locations and orientations within the scene. In some embodiments, the different perspectives/modes may be displayed on different computing devices. For example, a desktop computer may display an isometric floor-plan for the user while the user wears a 3D-enabled headset (e.g. an AR/VR/MR headset) in a free-third-person mode. In some embodiments, the 3D-enabled headset is associated with a virtual camera, while the location of the virtual camera is displayed on the floor-plan. As the user moves the 3D-enabled headset, the location of the virtual camera is updated, updating the perspective of the virtual camera and the location of the virtual camera on the floor-plan. In this way, the user is enabled to see their location on the floor-plan as they navigate the scene.

In some embodiments, real-time data used to generate the 3D representation may be augmented by data captured in the past. For example, as the AR device wearer moves or looks around, a 3D representation of the scene is captured from different perspectives. Data from these different perspectives may be integrated into the 3D representation, enabling the user to view more of the scene than the immediate perspective of the AR device. Similarly, data captured with other devices, live or from the past, may also be integrated into the 3D representation. In some embodiments the other device is a stationary camera. In other embodiments, the other device is another AR device worn by another meeting participant, enabling perspectives from multiple meeting participants to be integrated into the 3D representation.

In some embodiments, a history of the 3D environment as it was recorded over time is saved, such that the user may pause, rewind, and fast-forward the 3D representation. This enables a $4^{th}$ dimensional component of the navigation, allowing the user to replay a scene from different perspectives. For example, if the AR device wearer drops a bolt and it gets away from him, the user may search the 3D environment from multiple perspectives and from multiple points in time to track down the missing bolt.

The HCI disclosed herein can enable users to efficiently investigate and/or navigate a 3D representation of a real-world environment, independent of the perspectives of one or more cameras used to generate the 3D representation. This can result in more efficient use of computing resources such as processor cycles, memory, network bandwidth, and power, as compared to previous solutions. Other technical benefits not specifically mentioned herein can also be realized through implementations of the disclosed subject matter.

In order to realize the technical benefits mentioned briefly above, and potentially others, a computing device configured with sensors and program code capable of 3D spatial mapping, such as an AR device or appropriately-configured smartphone, generates mesh data that defines a 3D representation of a real-world environment. The computing device also generates still or moving images (i.e. a video) of the real-world environment. Such a computing device can also be utilized to augment a user's view of the real-world environment with virtual objects. The virtual objects appear as if they are actually present in the real-world environment when the real-world environment is viewed with the computing device. The computing device transmits the mesh data and images to a remote computing device over a suitable data communications network.

It should be appreciated that various aspects of the subject matter described briefly above and in further detail below can be implemented as a hardware device, a computer-implemented method, a computer-controlled apparatus or device, a computing system, or an article of manufacture, such as a computer storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those specifically described herein, including multiprocessor systems, microprocessor-based or programmable consumer electronics, AR, VR, and MR devices, video game devices, handheld computers, smartphones, smart televisions, self-driving vehicles, smart watches, e-readers, tablet computing devices, special-purpose hardware devices, network appliances, and the others.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION

Figure 1:
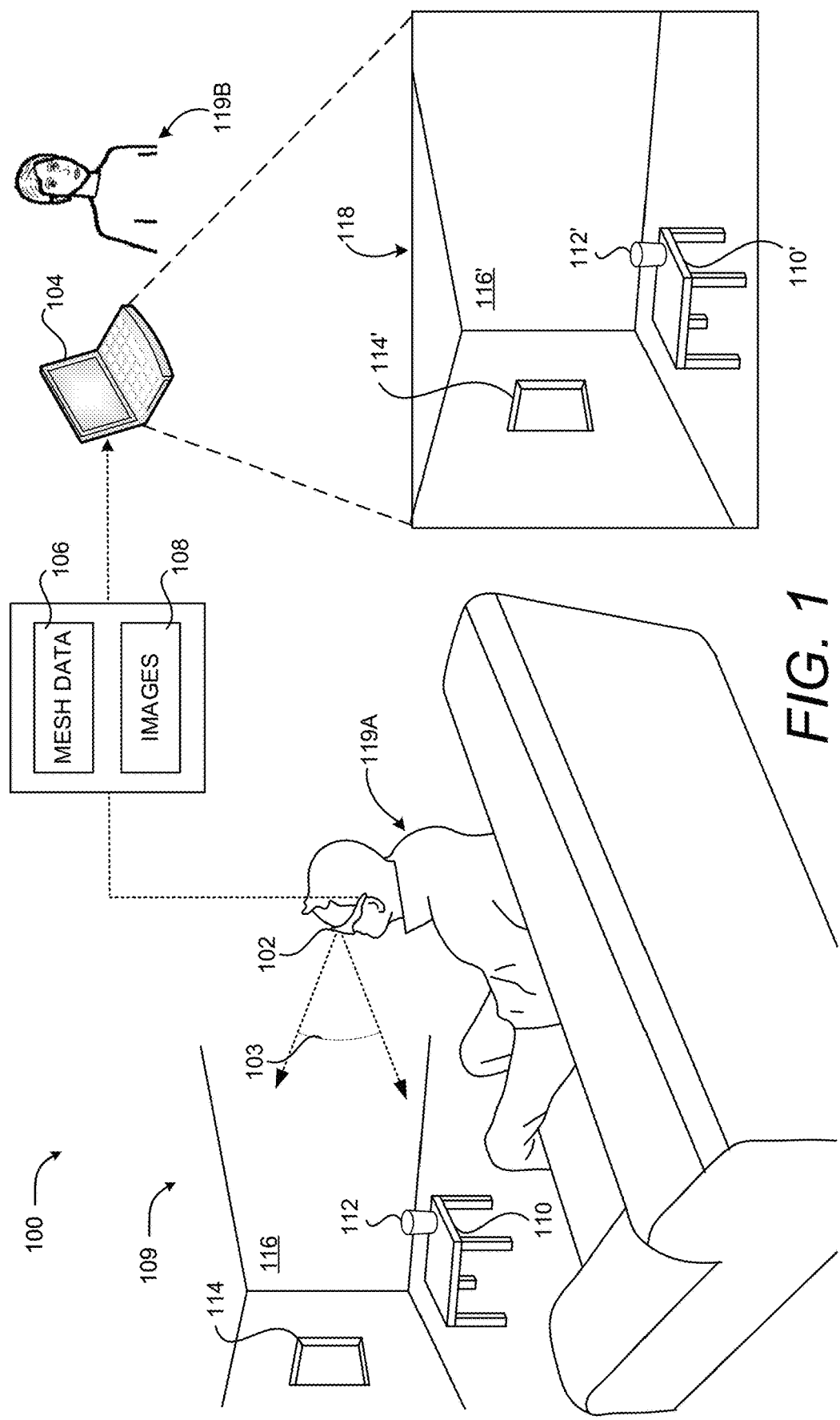
FIG. 1 is a computing system diagram illustrating aspects of an operating environment for the embodiments disclosed herein along with aspects of an illustrative HCI that enables a 3D representation of a real-world environment through a video call, according to one embodiment disclosed herein.

The following Detailed Description describes an improved human-computer interface ("HCI") for viewing a three-dimensional ("3D") representation of a real-world environment from different, changing, and/or multiple perspectives. As mentioned above, the disclosed HCI can capture a 3D representation of a scene using an augmented reality device, transmit the 3D representation to a computing device, and then render on the computing device a different perspective of the 3D representation. This can result in more efficient use of computing resources such as processor cycles, memory, network bandwidth, and power, as compared to previous solutions for viewing multiple perspectives of a scene that utilized different cameras and different video streams for each perspective viewed by the computing device. Technical benefits other than those specifically described herein might also be realized through implementations of the disclosed technologies.

As discussed briefly above, a networked meeting represents one popular form of electronic collaboration that utilizes an application program (e.g., CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE FOR BUSINESS and TEAMS provided by MICROSOFT CORPORATION, of Redmond, Wash.) to facilitate communication between two or more participants present at separate physical locations. As also discussed briefly above, participants of a communication session in a networked meeting are able to exchange live video, audio, and other types of content to view, hear, and otherwise share information. Participants can also view a common space, e.g., a whiteboard or a shared application, through which ideas can be exchanged. Viewing of the common space can be complemented with a video and audio conference, an instant messaging session, or any combination thereof, such that the networked meeting can act as a near substitute for an in-person meeting.

Various types of computing devices can be utilized to participate in networked meetings including, but not limited to, smartphones, tablet computing devices, set-top boxes, smart televisions, video game systems, and even AR, VR, and MR devices. When a participant utilizes an AR device to participate in a networked meeting, the AR device might capture that participant's view of their surrounding environment and transmit images or video of the view to the other meeting participants. The other meeting participants might then be presented with the images or video of the real-world environment surrounding the user wearing the AR device. The other meeting participants might also be able to view any virtual objects that the AR device has overlaid upon the real-world environment.

While meeting participants can view the real-world environment surrounding the user of an AR device, the view is limited to the perspective of the AR device, i.e. the position and orientation of the camera(s) comprising the AR device. As a result, users are constrained to this view when it would often be beneficial to observe the scene from a different perspective or multiple different perspectives. This constraint—each perspective originates from a different camera transmitting a different video stream, can result in inefficient use of computing resources such as, but not limited to, processor cycles, memory, network bandwidth, and power. Moreover, even when multiple cameras transmit multiple video streams of the real-world environment, perspectives between the cameras are elusive. This limited number of perspectives can result in a user spending more time attempting to perform the function of the meeting, e.g. diagnosing a mechanical problem, evaluating a prototype, pricing a piece of artwork, etc. The disclosed HCI addresses the technical considerations set forth above, and potentially others, and thereby provides technical benefits to computing systems implementing the disclosed technologies.

Turning now to the figures (which might be referred to herein as a "FIG." or "FIGS."), additional details will be provided regarding an improved HCI disclosed herein with reference to the accompanying drawings that form a part hereof. The FIGS. show, by way of illustration, specific configurations or examples. Like numerals represent like or similar elements throughout the FIGS. In the FIGS., the left-most digit(s) of a reference number generally identifies the figure in which the reference number first appears. References made to individual items of a plurality of items can use a reference number with another number included within a parenthetical (and/or a letter without a parenthetical) to refer to each individual item. Generic references to the items might use the specific reference number without the sequence of letters. The drawings are not drawn to scale.

FIG. 1 is a computing system diagram illustrating aspects of an operating environment for the embodiments disclosed herein along with aspects of an illustrative HCI that enables a 3D representation of a real-world environment through a video call, according to one embodiment disclosed herein. As shown in FIG. 1, a system 100 disclosed herein utilizes a computing device 102 in some embodiments. The computing device 102, alone or in combination with one or more other devices (e.g. a local computer or one or more remote computing devices 104), might form a system 100 that performs or otherwise implements the various processes and techniques described herein.

In the configuration shown in FIGS., the computing device 102 takes the form of a wearable, head-mounted display device that is worn by a user. It will be understood, however, that the computing device 102 might take a variety of different forms other than the specific configurations depicted in the FIGS. Although the configurations disclosed herein are discussed primarily in the context of AR devices, it is to be appreciated that the technologies disclosed herein can also be utilized with other types of devices that include functionality for spatial mapping such as, but not limited to, appropriately configured VR devices, MR devices smartphones, and tablet computing devices.

The computing device 102 is configured with sensors, other hardware, and program code capable of 3D spatial mapping, such as an AR device or appropriately-configured smartphone, that generates mesh data 106. The mesh data 106 defines a 3D representation of a real-world environment 109, including any physical objects such as table 110, window 114, and wall 116 in the real-world environment 109. Examples of mesh data 106 include, but are not limited to, a 3D depth map. The computing device 102 can also capture audio present in the real-world environment 109, such as speech of the user 119A. The computing device 102 also generates still or moving images 108 (i.e. a video) of the real-world environment 109. The terms "image" or "images," as used herein, encompass both still images and moving images, such as digital video. In some embodiments, images 108 are embedded into mesh data 106, such that a single stream of combined 3D depth map and image data is provided to remote computing device 104.

The computing device 102 includes one or more display panels (not shown in FIG. 1) that display computer generated ("CG") graphics. For example, the computing device 102 might include a right-eye display panel for right-eye viewing and a left-eye display panel for left-eye viewing. A right-eye display panel is typically located near a right eye of the user to fully or partially cover a field of view of the right eye, and a left-eye display panel is located near a left eye of the user to fully or partially cover a field of view of the left eye.

In another example, a unitary display panel might extend over both the right and left eyes of a user and provide both right-eye and left-eye viewing via right-eye and left-eye viewing regions of the unitary display panel. In each of these implementations, the ability of the computing device 102 to separately display different right-eye and left-eye graphical content via right-eye and left-eye displays might be used to provide a user 119A of the computing device 102 with a stereoscopic viewing experience.

The computing device 102 might include a variety of on-board sensors. For example, and without limitation, a sensor subsystem (not shown in FIG. 1) might include one or more outward facing optical cameras (e.g., cameras located on an external surface of the computing device 102 and forward facing in a viewing direction of the user 119A). The computing device 102 can also include one or more inward facing optical cameras (also not shown in FIG. 1) (e.g., rearward facing toward the user 119A and/or toward one or both eyes of the user 119A).

The computing device 102 can also include a variety of other sensors (not shown in FIG. 1) including, but not limited to, accelerometers, gyroscopes, magnetometers, environment understanding cameras, depth cameras (which might be referred to as scene reconstruction or "SR" cameras), inward or outward facing video cameras, microphones, ambient light sensors, and potentially other types of sensors. Data obtained by the sensors can be utilized to detect the location, orientation (which might be referred to as a "pose"), and movement of the computing device 102.

The one or more outward facing optical cameras of the computing device 102 can be configured to observe the real-world environment 109 and output images 108 illustrating the real-world environment 109 observed by a user 119A of the computing device 102. The optical cameras are red-green-blue ("RGB") cameras and infrared cameras in one embodiment. It is to be appreciated, however, that other types of cameras can be utilized in other configurations such as, but not limited to, black and white ("B&W") cameras. Additionally, and as mentioned above, the same or different cameras can be utilized for tracking motion of the head of the user 119A (i.e. "head tracking).

The computing device 102 captures mesh data 106, images 108, and audio data from a perspective 103 of the computing device 102. As used herein, perspective refers to a point of view. In some embodiments, perspective 103 is determined by the location and orientation of computing device 102, e.g. when cameras or other sensors used to capture mesh data 106 and images 108 are fixed relative to computing device 102. As such, perspective 103 may change as user 119A moves or looks around the real-world environment 109. In other embodiments, one or more cameras or other sensors used to capture mesh data 106 and images 108 may be oriented independent of computing device 102, e.g. maintaining a perspective on a particular object even if the location and/or orientation of computing device 102 changes. Perspective, combined with focal length, a far distance clip, a close distance clip, and other attributes, may define a field of view, i.e. a portion of the real-world environment 109 (also referred to as the 'scene') that is currently being captured by the cameras and other sensors of computing device 102. "Field of view" may also be referred to as the "projection" of the real-world environment.

The computing device 102 might also include a processing subsystem (not shown in FIG. 1) that includes one or more processor devices that perform at least some of the processes and operations described herein, as defined by instructions executed by the processing subsystem. Such processes or operations might include generating and providing image signals to the display panels, receiving sensory signals from sensors such as cameras, enacting control strategies and procedures responsive to those sensory signals, generating the mesh data 106, and transmitting the mesh data 106 to one or more remote computing devices 104. Other computing systems, such as local or remote computing devices 104 might also perform some of the computational tasks disclosed herein.

The computing device 102 might also include an on-board data storage subsystem (not shown in FIG. 1) that includes one or more memory devices storing computer-executable instructions (e.g., software and/or firmware) executable by the processing subsystem and might additionally hold other suitable types of data. The computing device 102 might also include a communications subsystem supporting wired and/or wireless communications with remote devices (i.e., off-board devices) over a communications network (not shown in FIG. 1). As an example, the communication subsystem of the computing device 102 might be configured to wirelessly send or receive mesh data 106, images 108, digital audio, and/or other information to and from the remote computing device 104.

The computing device 102 can also be utilized to augment a user's view of the real-world environment 109 with virtual objects, e.g. virtual glass 112. The virtual objects appear as if they are actually present in the real-world environment 109 when the real-world environment 109 is viewed with the computing device 102. Additional details regarding the configuration and operation of an illustrative computing device 102 will be provided below with regard to FIG. 8.

As described briefly above, the computing device 102 interacts with a remote computing device 104 in some embodiments. The remote computing device 104 may be a personal computer, a wearable computer, including a head mounted display ("HMD"), or any other type of computing device having components for causing a display of one or more images on a display, such as the illustrative graphical user interface ("UI") 118.

The remote computing device 104 executes an application program, or another type of program, that is configured to enable networked meetings, such as those described above. As also described briefly above, networked meetings can provide various types of communications sessions that enable participants, such as the user 119A wearing computing device 102 and a user 119B using the remote computing device 104 to share information. Such communications sessions can include, but are not limited to, a broadcast session (i.e. one participant to many), a conference session (i.e. many participants to many participants), or a peer-to-peer session (i.e. one participant to one other participant).

The remote computing device 104 also receives the mesh data 106 and images 108 generated by the computing device 102 and renders the images 108 in the UI 118. In this manner, a user 119B of the remote computing device can see the view of the real-world environment 109 as seen by the user 119A of the computing device 102 along with any virtual objects augmenting that view in the UI 118. It should be appreciated that, although not illustrated in FIG. 1, various network devices and connections can be utilized to enable data communications between the computing device 102 and the remote computing device 104.

In some embodiments, UI 118 maintains the perspective 103 of computing device 102. Although the field of view visible on UI 118 may be limited based on the viewing angle of computing device 102, the shared perspective may allow users 119A and 119B to collaborate based on the shared view of real-world environment 109. In some embodiments, remote computing device 104 renders the shared perspective by overlaying images 108 over mesh data 106 for display on UI 118. For example, real world objects such as table 110, window 114, and wall 116 may be depicted on UI 118 as table 110', window 114', and wall 116'. Similarly, virtual objects, such as glass 112, which appear to user 119A when wearing computing device 102, may also be rendered on UI 118, e.g. as glass 112.

Figure 2:
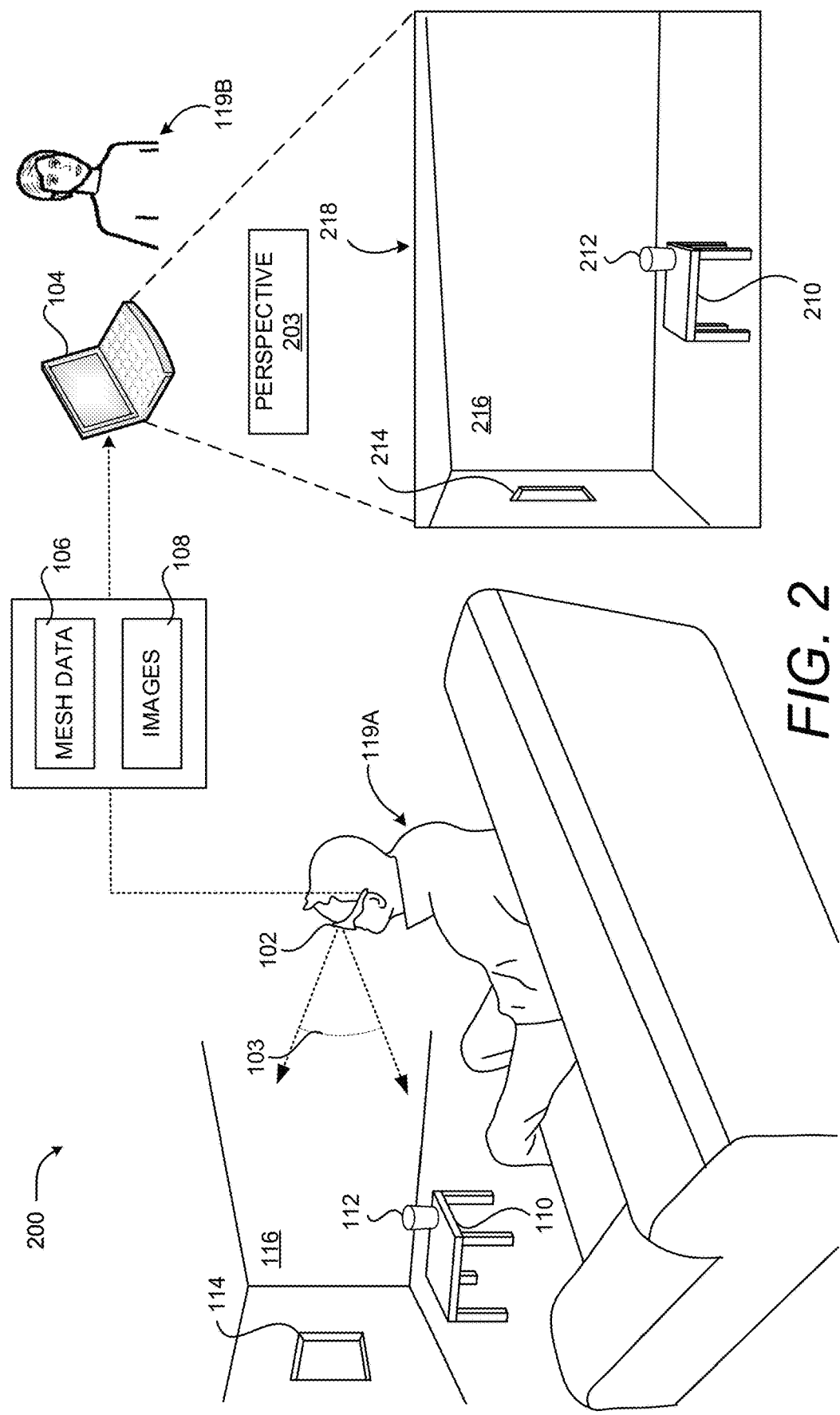
FIG. 2 is a computing system diagram illustrating a user viewing a 3D representation of a scene from a perspective other than the perspective of the camera capturing the scene.

FIG. 2 is a computing system diagram 200 illustrating a user 119B viewing a 3D representation 218 of a scene from a second perspective 203 that is other than (i.e. different from) the perspective 103 of the outward facing optical camera of the computing device 102 capturing the scene. While FIG. 2 depicts a particular second perspective 203, any other perspective is similarly contemplated, including other rotations, translations (e.g. simulating walking or flying around the real-world environment) or the like. As depicted in 3D representation 218, table 210, virtual glass 212, window 214, and wall 216 are depicted from the second perspective 203. In some embodiments this view is reconstructed from mesh data 106 and images 108 by generating the 3D representation, changing the point of view algorithmically, and projecting the updated 3D representation on remote computing device 104.

In some embodiments the user's device comprises a 2D display, such as an LCD monitor. Projecting the 3D representation onto a 2D display may involve steps such as generating a depth map from the new perspective. The depth map may be generated, for each pixel on the 2D display, by calculating a distance from the new perspective to a portion of the 3D representation associated with the pixel. For example, for each pixel that displays a part of table 210, a distance from the new perspective to the corresponding part of the table is calculated. In some embodiments, this calculation is based on positions of objects in the scene as encoded by mesh data 106. For example, table 210 may be comprised of a series of triangles, rectangles, or other geometric shapes, defined in size, orientation, and location. Determining a distance from the new 3D perspective may include determining a distance from the new 3D perspective to one or more of the geometric shapes included in mesh data 106.

In some embodiments, shadows cast by objects in the 3D representation are determined by casting light rays from light sources in the scene and calculating when those light rays strike an object in mesh data 106. The direction of light rays and the locations of objects they strike may be used to determine how lights cast shadows from the second perspective 203. In some embodiments, light sources are determined from mesh data 106 and images 108 based on machine learning techniques for identifying light-bulbs, lamps, and other light sources.

Next, in some embodiments, color values for each of the pixels are calculated based a color of the pixel derived from images 108, one or more lighting values (calculated based on light sources and shadows cast by other objects in the scene), and the like.

In some embodiments, the 3D representation is rendered using a 3D-enabled device, such as a VR/AR/MR device. In these embodiments, the 3D representation is rendered in 3D, avoiding the process of projecting a 3-dimensional representation onto a 2D display. However, determining shadows and other image processing operations occur as described above.

In some embodiments, virtual objects such as virtual glass 212 are included in the rendering process. In some embodiments, as discussed above, light sources may be detected within the scene. In these situations, lighting effects and shadows may be applied to virtual objects such as virtual glass 212. For example, a light source may be used to calculate a shadow cast by the virtual object.

In some embodiments, virtual objects placed in the scene may be rendered to include reflections, shading, or other details incorporated from surrounding objects. For example, a virtual sphere defined as having a reflective surface and placed next to a candle on a table-top may reflect images of the table top and the candle. This reflection may be accomplished using shader techniques, ray tracing, or other algorithms known in the art to estimate the effect that light from surrounding objects would have on virtual objects. Processing reflections on virtual objects may be performed by computing device 102 or remote computing device 104.

Embodiments depicted in FIG. 2 provide additional insight into the real-world environment in a computationally efficient manner by providing user 119B with additional viewing angles of the scene. For example, if user 119A is seeking help from user 119B positioning table 210 within the scene, user 119B may use the different perspective to judge how close table 210 should be positioned next to wall 116.

Figure 3:
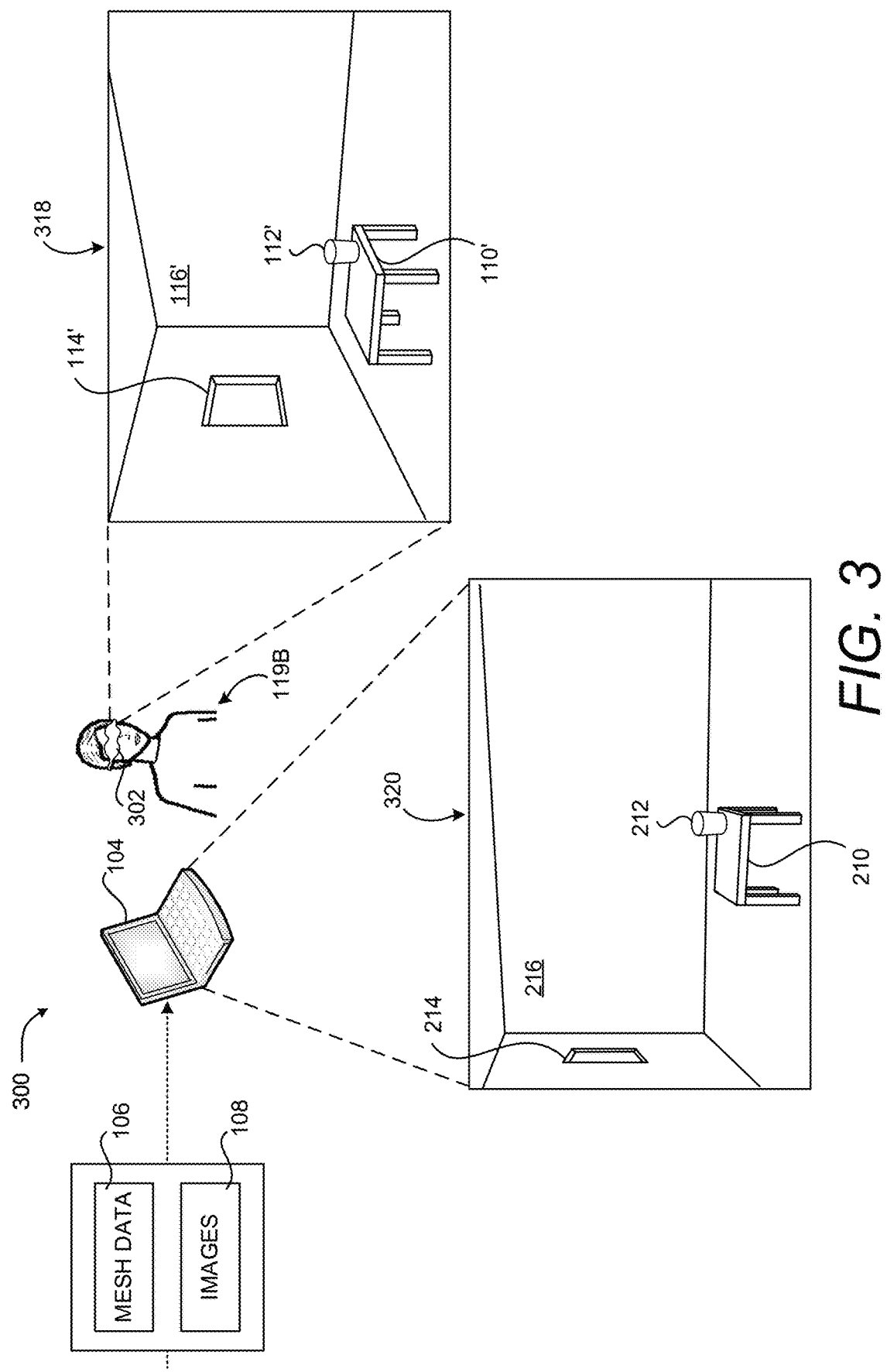
FIG. 3 is a computing system diagram illustrating two computing devices simultaneously displaying two different perspectives of a 3D representation of the scene.

FIG. 3 is a computing system diagram 300 illustrating two computing devices simultaneously displaying two different perspectives of a 3D representation of the scene. In some embodiments, user 119B is wearing a 3D-enabled device 302, which may be a VR headset, AR headset, MR headset, or similar device. 3D-enabled device 302 may display UI 318 containing a 3D representation of the scene from perspective 103. In this way, user 119B is enabled to view, through computing device 302, the scene as it is viewed by user 119A. At the same time, remote computing device 104 displays UI 320, viewing the scene from a different perspective, e.g. the perspective discussed above in conjunction with FIG. 2.

In some embodiments, the 3D perspective displayed in UI 318 may track the perspective of user 119A, e.g. as device 102 moves and/or rotates, the perspective displayed in UI 318 is updated to reflect the new perspective. For example, as user 119A moves through the scene, looks around, or otherwise changes the position and/or orientation of computing device 102, UI 318 may be updated to display the perspective from the new position/orientation of device 102.

In some embodiments, device 102 may be moved contiguously through the real-world environment such that the field of view does not change significantly from frame to frame. As such, the mesh data representation of one frame may contain a significant portion of the mesh data used to display a subsequent frame. In these situations, computing device 102 may transmit an update or 'diff' of mesh data.

In some embodiments, in order to provide a smoother visual experience for user 119B, device 102 may transmit the change in perspective (i.e. the new position and orientation of device 102) apart from the updated mesh data, allowing computing device 302 to use existing mesh data 106 display the new perspective while the updated mesh data is captured and transmitted. This existing mesh data is stale, as it does not incorporate additional information from the new perspective. However, once the additional mesh data information is received, device 302 may update the content of UI 318 accordingly.

At any time, user 119B may decouple the perspective of UI 318 from the perspective 103 of user 119A. This may be beneficial if user 119B sees something of interest in the scene or finds a perspective that is enlightening to the task at hand. User 119B may choose to pause the perspective temporarily, e.g. for a set amount of time, after which the perspective may revert to the real-time perspective of user 119A. Similarly, user 119B may choose to decouple from the perspective of user 119A indefinitely, or until user 119B makes another decision regarding a choice of perspective.

In some embodiments, user 119B may choose to create a virtual camera from the current perspective (either a paused perspective or a perspective that is tracking perspective 103 of user 119A). The virtual camera may create a permanent or semi-permanent perspective of the scene. In this way, user 119B may identify multiple different perspectives that are of value to accomplishing the task at hand.

In some embodiments, user 119A may change the perspective displayed on UI 318, e.g. rotating between a paused perspective, a live perspective, a virtual camera perspective, or the like. In some embodiments, multiple perspectives may be displayed simultaneously on device 302, e.g. in a grid pattern. In some embodiments, user 119B may select one of the perspectives to be displayed on a different device, such as UI 320 of remote computing device 104. This flexibility in determining new perspectives, selecting from a list of perspectives for display, and selecting the displays/devices on which to view the perspectives greatly enhances the meeting experience, in many cases providing more information to user 119B than a person physically present in the room with user 119A.

In some embodiments, pausing, decoupling, or otherwise changing the perspective displayed on one or more UIs does not stop the 3D representation of the scene from being rendered. For example, if user 119A is building a house of cards, user 119B may pause the perspective displayed in UI 318 while continuing to watch user 119A build the house of cards. Pausing the perspective causes user 119B to view the scene from a fixed perspective, even if the perspective of user 119A continues to change. User 119B may wish to pause the perspective if user 119A is making sudden changes to perspective 103 that distract from the content of the scene, among other reasons.

Figure 4:
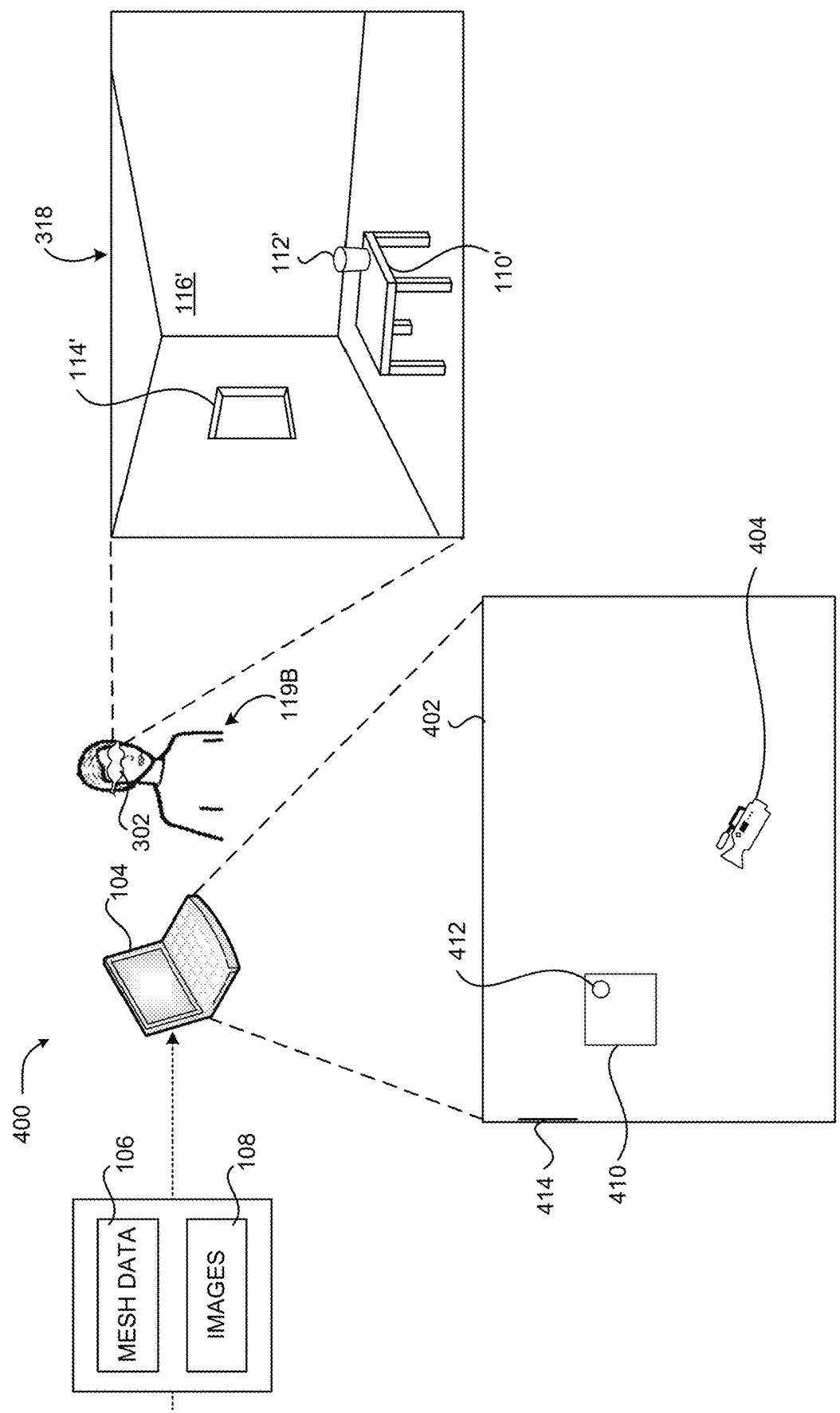
FIG. 4 is a computing system diagram illustrating a location of a virtual camera on a floor-map of a 3D representation of the scene.

FIG. 4 is a computing system diagram 400 illustrating a location of a virtual camera 404 on a floor-map 402 of a 3D representation of the scene. As illustrated, virtual camera 404 is oriented to view table 410, virtual glass 412, and window 414. Virtual camera 404 may be fixed at a location and/or orientation, or virtual camera 404 may be tied to a location and/or orientation of a device such as device 102. For example, virtual camera 404 may identify the location and/or orientation of device 102 as user 119A sits on a couch viewing the scene but will be updated accordingly if user 119A moves device 102. In other embodiments, virtual camera 404 may represent the perspective of a device used to view a 3D representation of the scene. For example, virtual camera 404 may represent a perspective of device 302. In some embodiments, the location and/or orientation of virtual camera 404 is set by user 119B, e.g. as discussed above in conjunction with FIG. 3. Additionally or alternatively, the location and/or orientation of virtual camera 404 may be set by user 119A.

In some embodiments, virtual camera 404 may be moved throughout floor-map 402 using a mouse or other pointer input device, e.g. by clicking on virtual camera 404 and dragging it to another position. Keyboard input, or any other type of human computer interface, may also be used to move and/or redirect the orientation of virtual camera 404. In some embodiments, a perspective generated by virtual camera 404 may be displayed by a UI. In these embodiments, as the location and/or orientation of virtual camera 404 is changed, the associated perspective of the 3D representation is updated. For example, if computing device 302 is associated with virtual camera 404, changing the location and/or orientation of virtual camera 404 may change the perspective displayed in UI 318. Conversely, if user 119B moves computing device 302, changing the perspective of the 3D representation displayed by computing device 302, virtual camera 404 may be moved accordingly on floor-map 402 to reflect the new perspective.

In some embodiments, virtual camera 404 may be assigned to track a target object in the scene, such as a person, an object identified as needing repair, or the like. Once the target object is selected by a user (e.g. user 119A or 119B), a 3D model of the target object may be extracted from mesh data 106. Then, if the target object is moved in the real-world scene, e.g. if user 119A picks it up and sets it down in a new location, one of computing devices 102, 104, or 302 may search the scene to locate the 3D model of the target object in the new location. Once the new location of the target object has been identified, virtual camera 404 may automatically change perspective to keep the target object in view.

Floor-map 402 may comprise a top-down view of the scene (as illustrated), an isometric view of the scene, or the like. Floor-map 402 may, in some embodiments, be generated using the same mesh data 106 and/or images 108 used to generate a 3D representation of the scene. A floor-map may be useful by providing context to user 119B, who may not otherwise realize the extent of the scene.

Figure 5:
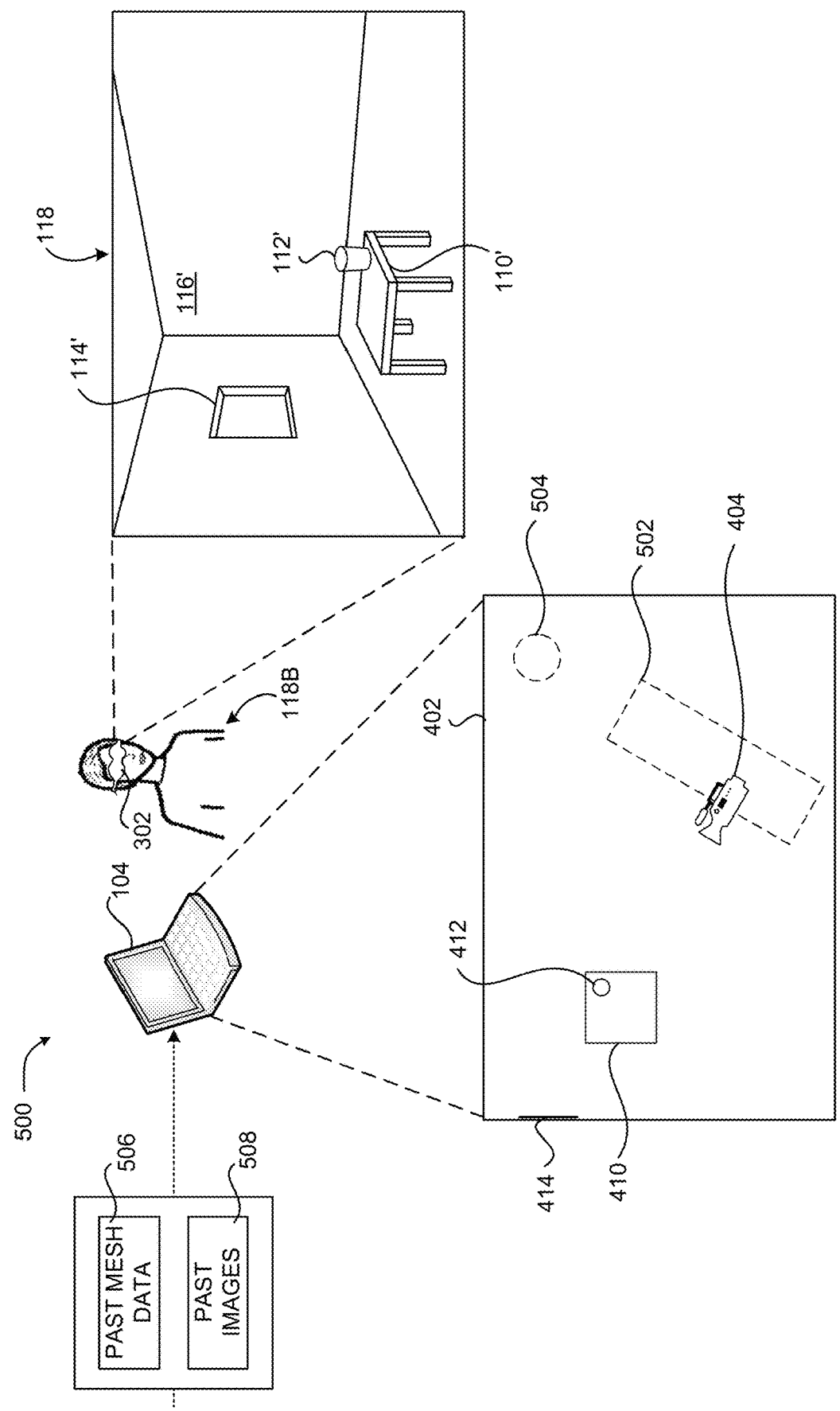
FIG. 5 is a computing system diagram illustrating a 3D representation of the scene that has been integrated with data captured in the past.

FIG. 5 is a computing system diagram 500 illustrating a 3D representation of the scene that has been integrated with data captured in the past. In some embodiments, couch 502 and lamp 504 were captured in the past, generating past mesh data 506 and past images 508. Past captures may have been performed by device 102, or by another device (not pictured). In some embodiments, past captures may have been performed during the course of the meeting, e.g. when user 119A was directing computing device 102 towards couch 502 and lamp 504. By saving the information captured about these objects (mesh data and images) and integrating this data with the real-time stream of mesh data and images, a more complete scene may be available to user 119B than the real-time data alone can provide.

Data captured in the past may also be used to provide additional details of objects currently in view of the live stream. For example, table 410 may be captured from the perspective of computing device 102, but real-time data is not available for parts of table 410 that are occluded. As such, without integrating data captured in the past, user 119B would not be able to view the occluded portions of table 410.

In some embodiments, computing device 102 may identify a room or other environment it is in based on mesh data. For example, computing device 102 may infer the size of the room based on the location and size of walls, the location and size of windows, and the location and size of other objects that do not tend to move. Once the room has been identified, mesh data and images previously captured from within the room may be integrated in the real-time 3D representation. Other environments besides rooms, indoor and outdoor, are similarly contemplated.

Figure 6:
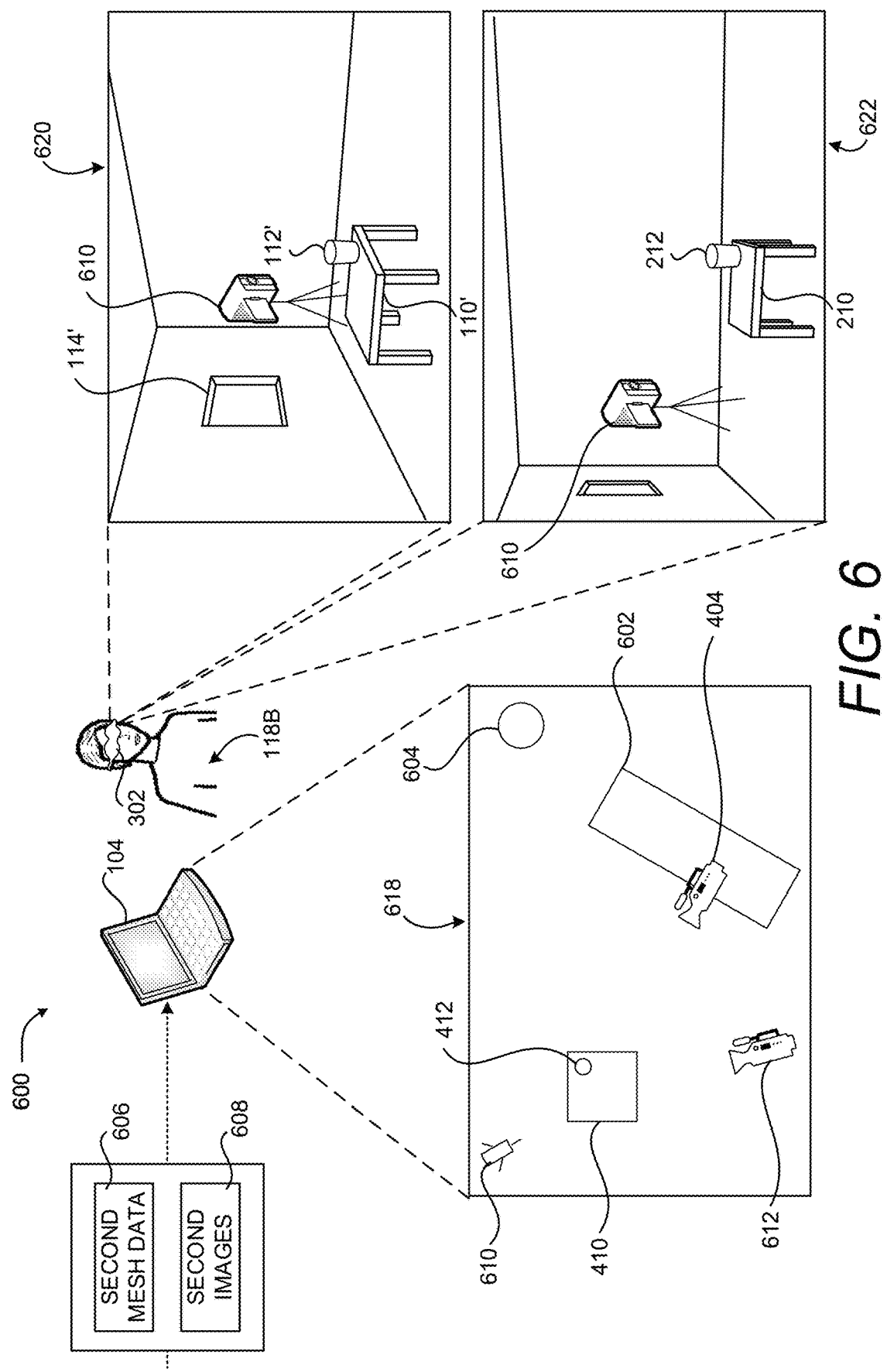
FIG. 6 is a computing system diagram illustrating a 3D representation of the scene that has been integrated with data captured by a second camera.

FIG. 6 is a computing system diagram 600 illustrating a 3D representation of the scene that has been integrated with data captured by a second camera 610. In some embodiments, second camera 610 has been added to the computing environment. Second camera 610 may comprise a depth finding camera (also described herein as a scene reconstruction or 'SR' camera) in addition to an RGB optical camera. Second camera 610 may generate additional mesh data, adding to mesh data 106 captured in real-time and/or mesh data previously captured.

In some embodiments, UI 618 depicts a floor-plan view of the scene, integrating data from computing device 102 and second camera 610. As such, couch 602 and lamp 604 are rendered based on real-time data. Similarly, some portions of table 410 that would be occluded if second camera 610 was not present, are visible.

In some embodiments, virtual camera 404 depicts the location and orientation of a virtual camera associated with computing device 302. The perspective of virtual camera 404 is rendered in UI 620. Similarly, the perspective of virtual camera 612 is rendered in UI 622. In one embodiment, user 119B is enabled to switch between the perspectives of UI 620 and UI 622.

In one embodiment, second camera 610 is included in UIs 620 and 622, as second camera 610 is a real-world object included in the scene. However, in other embodiments, computing device 102 may not render other cameras in the scene. In some embodiments, computing device 102 may know the location of other cameras in the scene. Mesh data and images captured from a time when the other camera was not present may be substituted for the mesh data and images of the other camera devices.

Figure 7:
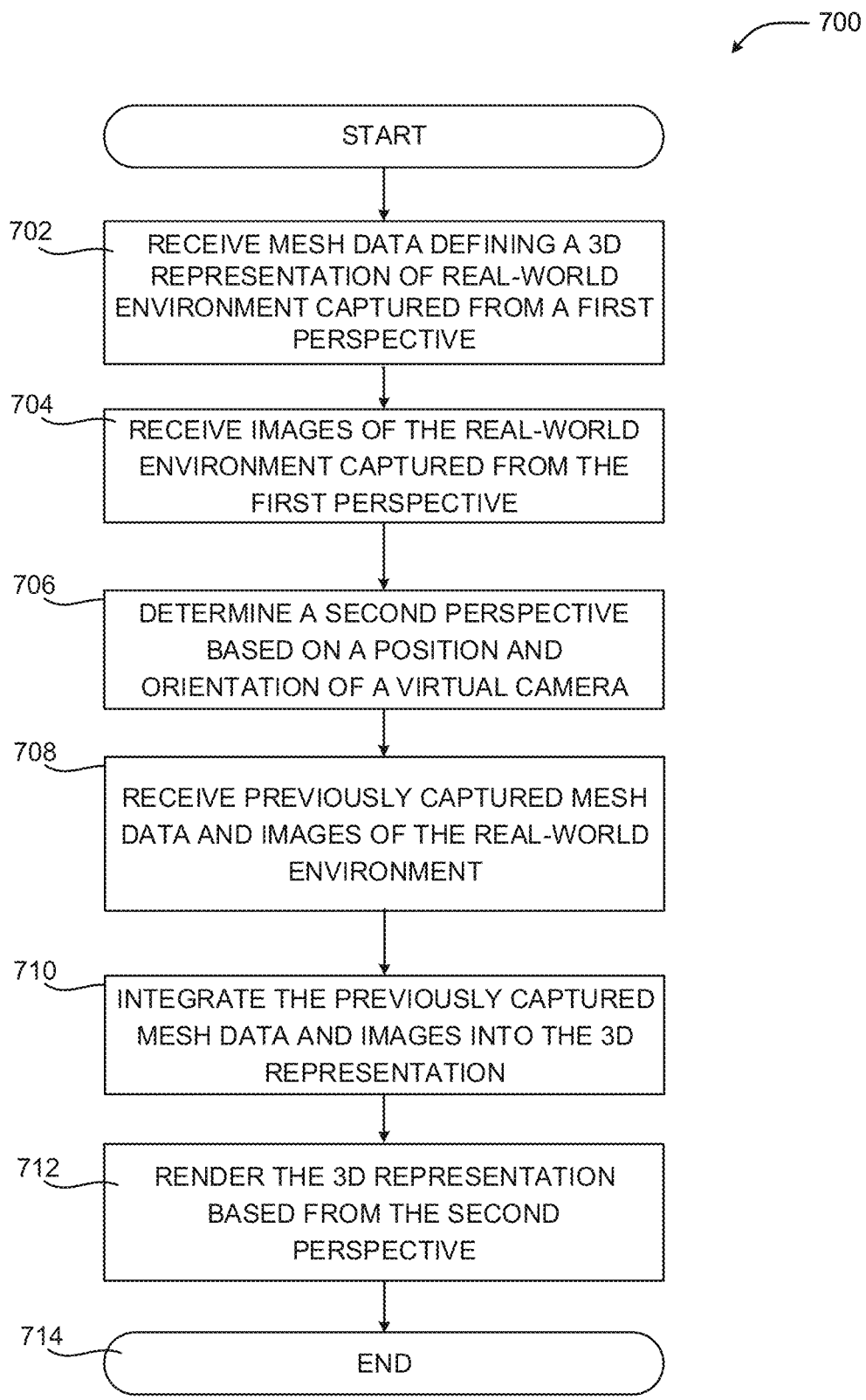
FIG. 7 is a computing system diagram illustrating aspects of a routine for rendering different perspectives of a 3D environment.

FIG. 7 is a computing system diagram illustrating aspects of a routine for rendering different perspectives of a 3D environment. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 7 and the other FIGS. can be implemented in association with the example computing devices and UIs described above with respect to FIGS. 1 through 6. For instance, the various device(s) and/or module(s) described herein can generate, transmit, receive, and/or display data associated with content of a communication session (e.g., live content, recorded content, etc.) and/or a 3D representation that includes images 108 of one or more participants (e.g. the user 119A or a user 119B of the remote computing device 104), avatars, channels, chat sessions, video streams, images, virtual objects, and/or applications associated with a communication session.

The routine 700 begins at operation 702, where the remote computing device 104 receives mesh data 106 that defines a 3D representation of a real-world environment 109 from the computing device 102. In some embodiments, the mesh data has been captured by device 102 from a perspective 103 of device 102. The routine then proceeds to operation 704, where the remote computing device 104 receives images 108 of the real-world environment 109 from the computing device 102, also from perspective 103. The routine 700 then proceeds from operation 704 to operation 706.

At operation 706, the remote computing device 104 determines a second perspective, in one embodiment, based on a position and orientation of a virtual camera. In some embodiments, the perspective is different from perspective 103 of computing device 102. As discussed above, the second perspective may be based on a position and orientation of a computing device 302 worn by user 119B, a fixed perspective, a perspective tied to an object selected from the scene, or the like.

The routine 700 then proceeds to operation 708, where the remote computing device 104 receives previously captured mesh data and images of the real-world environment. As discussed above in conjunction with FIGS. 5 and 6, previously captured mesh data and images may have been captured by computing device 102 at an earlier point in the meeting, even minutes or seconds before the present moment. For example, as user 119A scans the room, or walks around the room, mesh data and images may be captured for different parts of the room. Additionally or alternatively, previously captured mesh data and images may have been captured by a different computing device, e.g. second camera 610.

The routine 700 then proceeds to operation 710, where the previously captured mesh data and images are integrated into the real-time 3D representation of the real-world environment. In some embodiments, integration of previously captured mesh data adds objects, or perspectives of objects, to the 3D environment that are not visible from the real-time mesh data and images captured by computing device 102.

Once the previously captured mesh data and images have been integrated into the received mesh data and images, the routine 700 proceeds to operation 712, where the remote computing device 104 renders the 3D representation from the second perspective. From operation 712 the routine 700 proceeds to operation 714, where it ends.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 8:
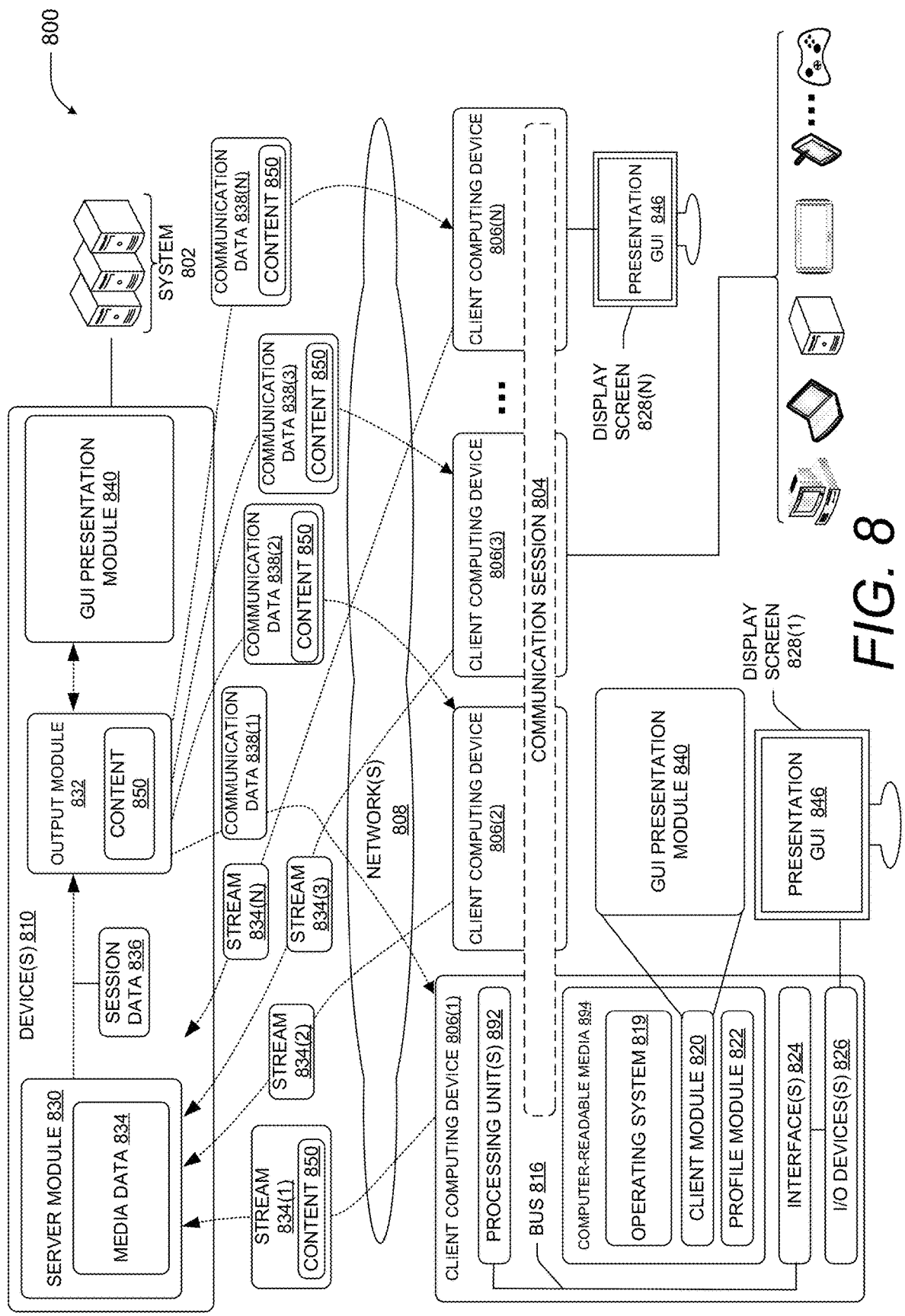
FIG. 8 is a computing system diagram showing aspects of an illustrative operating environment for the technologies disclosed herein.

FIG. 8 is a diagram illustrating an example environment 800 in which a system 802 can operate to populate the HCI disclosed herein with images 108, virtual objects 112, and/or other types of presentation content. In some implementations, a system implemented agent may function to collect and/or analyze data associated with the example environment 800. For example, the agent may function to collect and/or analyze data exchanged between participants involved in a communication session 804 linked to the GUIs disclosed herein.

As illustrated, the communication session 804 may be implemented between a number of client computing devices 806(1) through 806(N) (where N is a positive integer number having a value of two or greater) that are associated with the system 802 or are part of the system 802. The client computing devices 806(1) through 806(N) enable users, also referred to as individuals, to participate in the communication session 804. For instance, the first client computing device 806(1) may be the remote computing device 104 of FIG. 1 and the second client computing device 806(2) may be the computing device 102 of FIG. 1, and AR device 1000 of FIG. 10.

In this example, the communication session 804 is hosted, over one or more network(s) 808, by the system 802. That is, the system 802 can provide a service that enables users of the client computing devices 806(1) through 806(N) to participate in the communication session 804 (e.g., via a live viewing and/or a recorded viewing). Consequently, a "participant" to the communication session 804 can comprise a user and/or a client computing device (e.g., multiple users may be in a communication room participating in a communication session via the use of a single client computing device), each of which can communicate with other participants. As an alternative, the communication session 804 can be hosted by one of the client computing devices 806(1) through 806(N) utilizing peer-to-peer technologies. The system 802 can also host chat conversations and other team collaboration functionality (e.g., as part of an application suite).

In some implementations, such chat conversations and other team collaboration functionality are considered external communication sessions distinct from the communication session 804. A computerized agent to collect participant data in the communication session 804 may be able to link to such external communication sessions. Therefore, the computerized agent may receive information, such as date, time, session particulars, and the like, that enables connectivity to such external communication sessions. In one example, a chat conversation can be conducted in accordance with the communication session 804. Additionally, the system 802 may host the communication session 804, which includes at least a plurality of participants co-located at a meeting location, such as a meeting room or auditorium, or located in disparate locations.

In examples described herein client computing devices 806(1) through 806(N) participating in the communication session 804 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 804 live as activity occurs, or alternatively, via a recording at a later time after the activity occurs. In examples described herein client computing devices 806(1) through 806(N) participating in the communication session 804 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 802 includes device(s) 810. The device(s) 810 and/or other components of the system 802 can include distributed computing resources that communicate with one another and/or with the client computing devices 806(1) through 806(N) via the one or more network(s) 808. In some examples, the system 802 may be an independent system that is tasked with managing aspects of one or more communication sessions such as communication session 804. As an example, the system 802 may be managed by entities such as SLACK, WEBEX, GOTOMEETING, GOOGLE HANGOUTS, etc.

Network(s) 808 may include, for example, public networks such as the Internet, private networks such as an institutional and/or personal intranet, or some combination of private and public networks. Network(s) 808 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 808 may utilize communications protocols, including packet-based and/or datagram-based protocols such as Internet protocol ("IP"), transmission control protocol ("TCP"), user datagram protocol ("UDP"), or other types of protocols. Moreover, network(s) 808 may also include a number of devices that facilitate network communications and/or form a hardware basis for the networks, such as switches, routers, gateways, access points, firewalls, base stations, repeaters, backbone devices, and the like.

In some examples, network(s) 808 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 810 may include one or more computing devices that operate in a cluster or other grouped configuration to share resources, balance load, increase performance, provide fail-over support or redundancy, or for other purposes. For instance, device(s) 810 may belong to a variety of classes of devices such as traditional server-type devices, desktop computer-type devices, and/or mobile-type devices. Thus, although illustrated as a single type of device or a server-type device, device(s) 810 may include a diverse variety of device types and are not limited to a particular type of device. Device(s) 810 may represent, but are not limited to, server computers, desktop computers, web-server computers, personal computers, mobile computers, laptop computers, tablet computers, or any other sort of computing device.

A client computing device (e.g., one of client computing device(s) 806(1) through 806(N)) may belong to a variety of classes of devices, which may be the same as, or different from, device(s) 810, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 806(1) through 806(N) of the various classes and device types can represent any type of computing device having one or more data processing unit(s) 892 operably connected to computer-readable media 894 such as via a bus 816, which in some instances can include one or more of a system bus, a data bus, an address bus, a PCI bus, a Mini-PCI bus, and any variety of local, peripheral, and/or independent buses.

Executable instructions stored on computer-readable media 894 may include, for example, an operating system 819, a client module 820, a profile module 822, and other modules, programs, or applications that are loadable and executable by data processing units(s) 892.

Client computing device(s) 806(1) through 806(N) may also include one or more interface(s) 824 to enable communications between client computing device(s) 806(1) through 806(N) and other networked devices, such as device(s) 810, over network(s) 808. Such network interface(s) 824 may include one or more network interface controllers (NICs) or other types of transceiver devices to send and receive communications and/or data over a network. Moreover, client computing device(s) 806(1) through 806(N) can include input/output ("I/O") interfaces 824 that enable communications with input/output devices 826 such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 806(1) is in some way connected to a display device (e.g., a display screen 828(1)), which can display a GUI according to the techniques described herein.

In the example environment 800 of FIG. 8, client computing devices 806(1) through 806(N) may use their respective client modules 820 to connect with one another and/or other external device(s) in order to participate in the communication session 804, or in order to contribute activity to a collaboration environment. For instance, a first user may utilize a client computing device 806(1) to communicate with a second user of another client computing device 806(2). When executing client modules 820, the users may share data, which may cause the client computing device 806(1) to connect to the system 802 and/or the other client computing devices 806(2) through 806(N) over the network(s) 808.

The client computing device(s) 806(1) through 806(N) may use their respective profile module 822 to generate participant profiles (not shown in FIG. 8) and provide the participant profiles to other client computing devices and/or to the device(s) 810 of the system 802. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 810 of the system 802 includes a server module 830 and an output module 832. In this example, the server module 830 is configured to receive, from individual client computing devices such as client computing devices 806(1) through 806(N), media streams 834(1) through 834(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen 828, etc.), and so forth.

Thus, the server module 830 is configured to receive a collection of various media streams 834(1) through 834(N) during a live viewing of the communication session 804 (the collection being referred to herein as "media data 834"). In some scenarios, not all the client computing devices that participate in the communication session 804 provide a media stream. For example, a client computing device may only be a consuming, or a "listening", device such that it only receives content associated with the communication session 804 but does not provide any content to the communication session 804.

In various examples, the server module 830 can select aspects of the media streams 834 that are to be shared with individual ones of the participating client computing devices 806(1) through 806(N). Consequently, the server module 830 may be configured to generate session data 836 based on the streams 834 and/or pass the session data 836 to the output module 832. Then, the output module 832 may communicate communication data 838 to the client computing devices (e.g., client computing devices 806(1) through 806(3) participating in a live viewing of the communication session). The communication data 838 may include video, audio, and/or other content data, provided by the output module 832 based on content 850 associated with the output module 832 and based on received session data 836.

As shown, the output module 832 transmits communication data 838(1) to client computing device 806(1), and transmits communication data 838(2) to client computing device 806(2), and transmits communication data 838(3) to client computing device 806(3), etc. The communication data 838 transmitted to the client computing devices can be the same or can be different (e.g., positioning of streams of content within a user interface may vary from one device to the next).

In various implementations, the device(s) 810 and/or the client module 820 can include GUI presentation module 840. The GUI presentation module 840 may be configured to analyze communication data 838 that is for delivery to one or more of the client computing devices 806. Specifically, the GUI presentation module 840, at the device(s) 810 and/or the client computing device 806, may analyze communication data 838 to determine an appropriate manner for displaying video, image, and/or content on the display screen 828 of an associated client computing device 806. In some implementations, the GUI presentation module 840 may provide video, image, and/or content to a presentation GUI 846 rendered on the display screen 828 of the associated client computing device 806. The presentation GUI 846 may be caused to be rendered on the display screen 828 by the GUI presentation module 840. The presentation GUI 846 may include the video, image, and/or content analyzed by the GUI presentation module 840.

In some implementations, the presentation GUI 846 may include a plurality of sections or grids that may render or comprise video, image, and/or content for display on the display screen 828. For example, a first section of the presentation GUI 846 may include a video feed of a presenter or individual, a second section of the presentation GUI 846 may include a video feed of an individual consuming meeting information provided by the presenter or individual. The GUI presentation module 840 may populate the first and second sections of the presentation GUI 846 in a manner that properly imitates an environment experience that the presenter and the individual may be sharing.

In some implementations, the GUI presentation module 840 may enlarge or provide a zoomed view of the individual represented by the video feed in order to highlight a reaction, such as a facial feature, the individual had to the presenter. In some implementations, the presentation GUI 846 may include a video feed of a plurality of participants associated with a meeting, such as a general communication session. In other implementations, the presentation GUI 846 may be associated with a channel, such as a chat channel, enterprise teams channel, or the like. Therefore, the presentation GUI 846 may be associated with an external communication session that is different than the general communication session.

Figure 9:
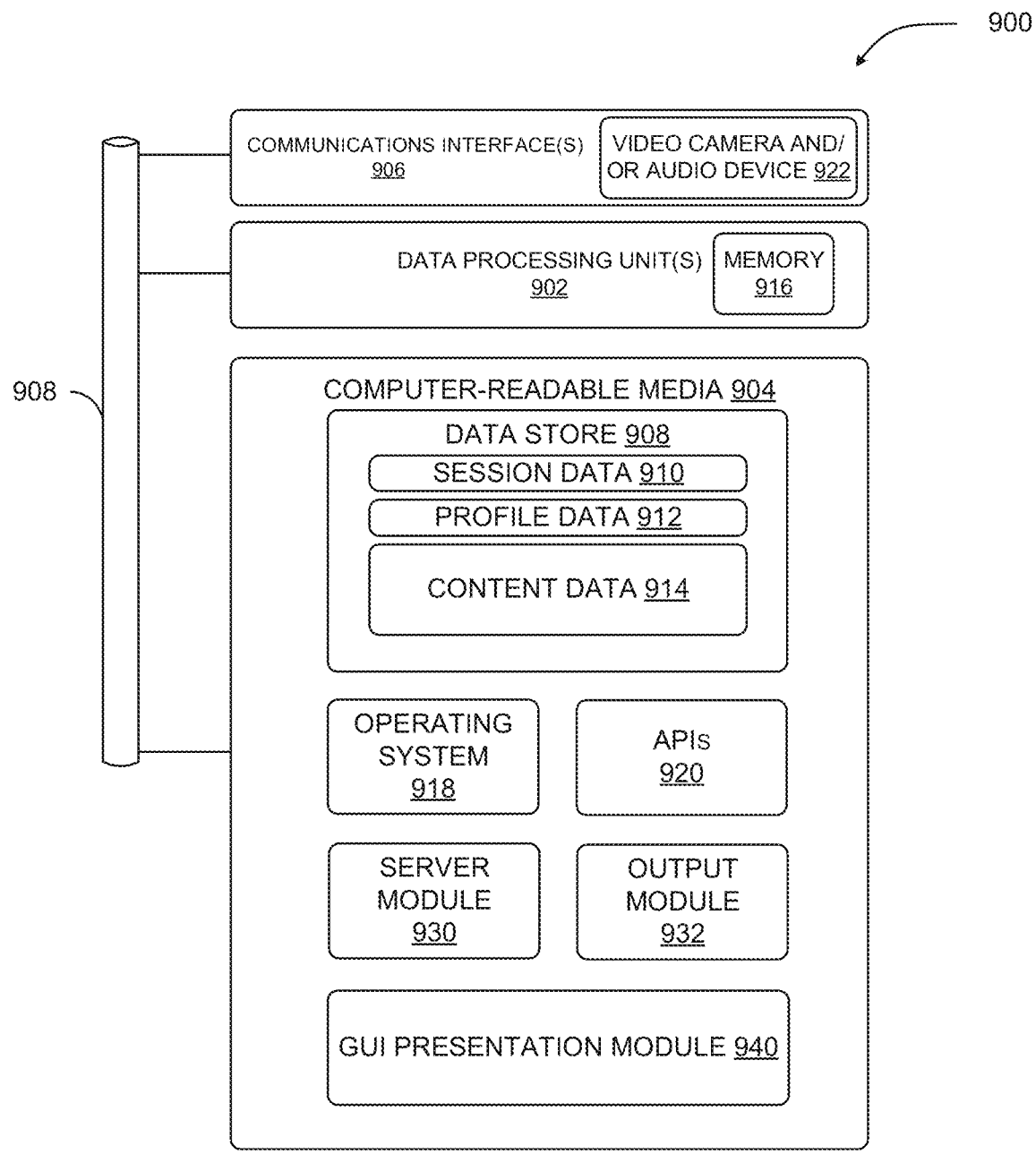
FIG. 9 is a computing architecture diagram showing aspects of the configuration and operation of a computing device that can implement aspects of the technologies disclosed herein.

FIG. 9 illustrates a diagram that shows example components of an example device 900 configured to populate the HCI disclosed herein that may include one or more sections or grids that may render or comprise video, image, virtual objects 116, and/or content for display on the display screen 828. The device 900 may represent one of device(s) 102 or 104. Additionally, or alternatively, the device 900 may represent one of the client computing devices 806.

As illustrated, the device 900 includes one or more data processing unit(s) 902, computer-readable media 904, and communication interface(s) 906. The components of the device 900 are operatively connected, for example, via a bus, which may include one or more of a system bus, a data bus, an address bus, a PCI bus, a Mini-PCI bus, and any variety of local, peripheral, and/or independent buses.

As utilized herein, data processing unit(s), such as the data processing unit(s) 902 and/or data processing unit(s) 892, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 904 and computer-readable media 894, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 906 may represent, for example, network interface controllers ("NICs") or other types of transceiver devices to send and receive communications over a network. Furthermore, the communication interface(s) 906 may include one or more video cameras and/or audio devices 922 to enable generation of video feeds and/or still images, and so forth.

In the illustrated example, computer-readable media 904 includes a data store 908. In some examples, data store 908 includes data storage such as a database, data warehouse, or other type of structured or unstructured data storage. In some examples, data store 908 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 908 may store data for the operations of processes, applications, components, and/or modules stored in computer-readable media 904 and/or executed by data processing unit(s) 902 and/or accelerator(s). For instance, in some examples, data store 908 may store session data 910 (e.g., session data 836), profile data 912 (e.g., associated with a participant profile), and/or other data. The session data 910 can include a total number of participants (e.g., users and/or client computing devices) in a communication session, activity that occurs in the communication session, a list of invitees to the communication session, and/or other data related to when and how the communication session is conducted or hosted. The data store 908 may also include content data 914, such as the content 850 that includes video, audio, or other content for rendering and display on one or more of the display screens 828.

Alternately, some or all of the above-referenced data can be stored on separate memories 916 on board one or more data processing unit(s) 902 such as a memory on board a CPU-type processor, a GPU-type processor, an FPGA-type accelerator, a DSP-type accelerator, and/or another accelerator. In this example, the computer-readable media 904 also includes operating system 918 and application programming interface(s) 920 (APIs) configured to expose the functionality and the data of the device 900 to other devices. Additionally, the computer-readable media 904 includes one or more modules such as the server module 930, the output module 932, and the GUI presentation module 940, although the number of illustrated modules is just an example, and the number may vary higher or lower. That is, functionality described herein in association with the illustrated modules may be performed by a fewer number of modules or a larger number of modules on one device or spread across multiple devices.

Figure 10:
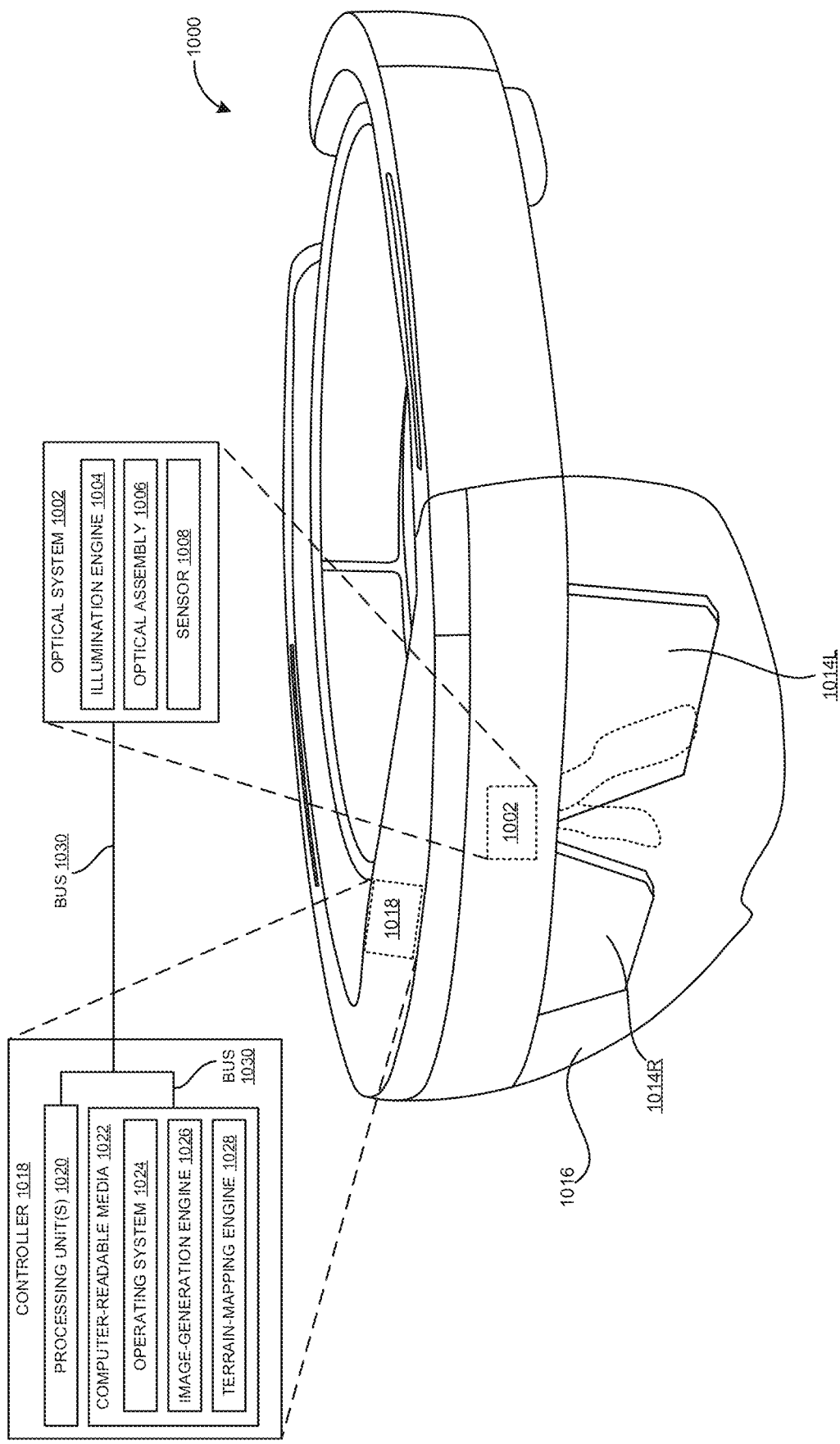
FIG. 10 is a computing device diagram showing aspects of the configuration and operation of an AR device that can implement aspects of the disclosed technologies, according to one embodiment disclosed herein.

FIG. 10 is a computing device diagram showing aspects of the configuration and operation of an AR device 1000 that can implement aspects of the systems disclosed herein. The AR device 1000 shows details of the computing device 102 shown in FIG. 1. As described briefly above, AR devices superimpose CG images over a user's view of a real-world environment 109. For example, an AR device 1000 such as that shown in FIG. 10 might generate composite views to enable a user to visually perceive a CG image superimposed over a real-world environment 109. As also described above, the technologies disclosed herein can be utilized with AR devices such as that shown in FIG. 10, VR devices, MR devices, and other types of devices that utilize depth sensing.

In the example shown in FIG. 10, an optical system 1002 includes an illumination engine 1004 to generate electromagnetic ("EM") radiation that includes both a first bandwidth for generating CG images and a second bandwidth for tracking physical objects. The first bandwidth may include some or all of the visible-light portion of the EM spectrum whereas the second bandwidth may include any portion of the EM spectrum that is suitable to deploy a desired tracking protocol. In this example, the optical system 1002 further includes an optical assembly 1006 that is positioned to receive the EM radiation from the illumination engine 1004 and to direct the EM radiation (or individual bandwidths thereof) along one or more predetermined optical paths.

For example, the illumination engine 1004 may emit the EM radiation into the optical assembly 1006 along a common optical path that is shared by both the first bandwidth and the second bandwidth. The optical assembly 1006 may also include one or more optical components that are configured to separate the first bandwidth from the second bandwidth (e.g., by causing the first and second bandwidths to propagate along different image-generation and object-tracking optical paths, respectively).

In some instances, a user experience is dependent on the AR device 1000 accurately identifying characteristics of a physical object such as the table 110 or plane (such as the real-world floor) and then generating the CG image in accordance with these identified characteristics. For example, suppose that the AR device 1000 is programmed to generate a user perception that a virtual gaming character is running towards and ultimately jumping over a real-world structure. To achieve this user perception, the AR device 1000 might obtain detailed data defining features of the real-world environment 109 around the AR device 1000. In order to provide this functionality, the optical system 1002 of the AR device 1000 might include a laser line projector and a differential imaging camera in some embodiments.

In some examples, the AR device 1000 utilizes an optical system 1002 to generate a composite view (e.g., from a perspective of a user that is wearing the AR device 1000) that includes both one or more CG images and a view of at least a portion of the real-world environment 109. For example, the optical system 1002 might utilize various technologies such as, for example, AR technologies to generate composite views that include CG images superimposed over a real-world view. As such, the optical system 1002 might be configured to generate CG images via an optical assembly 1006 that includes a display panel 1014.

In the illustrated example, the display panel includes separate right eye and left eye transparent display panels, labeled 1014R and 1014L, respectively. In some examples, the display panel 1014 includes a single transparent display panel that is viewable with both eyes or a single transparent display panel that is viewable by a single eye only. Therefore, it can be appreciated that the techniques described herein might be deployed within a single-eye device (e.g. the GOOGLE GLASS AR device) and within a dual-eye device (e.g. the MICROSOFT HOLOLENS AR device).

Light received from the real-world environment 112 passes through the see-through display panel 1014 to the eye or eyes of the user. Graphical content computed by an image-generation engine 1026 executing on the processing units 1020 and displayed by right-eye and left-eye display panels, if configured as see-through display panels, might be used to visually augment or otherwise modify the real-world environment 109 viewed by the user through the see-through display panels 1014. In this configuration, the user is able to view virtual objects that do not exist within the real-world environment 109 at the same time that the user views physical objects such as the table 110 within the real-world environment 109. This creates an illusion or appearance that the virtual objects are physical objects like the table 110 or physically present light-based effects located within the real-world environment 109.

In some examples, the display panel 1014 is a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the AR device 1000 further includes an additional see-through optical component, shown in FIG. 10 in the form of a transparent veil 1016 positioned between the real-world environment 109 and the display panel 1014. It can be appreciated that the transparent veil 1016 might be included in the AR device 1000 for purely aesthetic and/or protective purposes.

The AR device 1000 might further include various other components (not all of which are shown in FIG. 10), for example, front-facing cameras (e.g. red/green/blue ("RGB"), black & white ("B&W"), or infrared ("IR") cameras), speakers, microphones, accelerometers, gyroscopes, magnetometers, temperature sensors, touch sensors, biometric sensors, other image sensors, energy-storage components (e.g. battery), a communication facility, a global positioning system ("GPS") a receiver, a laser line projector, a differential imaging camera, and, potentially, other types of sensors. Data obtained from one or more sensors 1008, some of which are identified above, can be utilized to determine the orientation, location, and movement of the AR device 1000. As discussed above, data obtained from a differential imaging camera and a laser line projector, or other types of sensors, can also be utilized to generate a 3D depth map of the surrounding real-world environment 109.

In the illustrated example, the AR device 1000 includes one or more logic devices and one or more computer memory devices storing instructions executable by the logic device(s) to implement the functionality disclosed herein. In particular, a controller 1018 can include one or more processing units 1020, one or more computer-readable media 1022 for storing an operating system 1024, other programs (such as a 3D depth map generation module configured to generate the mesh data 106) in the manner disclosed herein), and data.

In some implementations, the AR device 1000 is configured to analyze data obtained by the sensors 1008 to perform feature-based tracking of an orientation of the AR device 1000. For example, in a scenario in which the object data includes an indication of a stationary physical object 110 within the real-world environment 109 (e.g., the table 110), the AR device 1000 might monitor a position of the stationary object within a terrain-mapping field-of-view ("FOV"). Then, based on changes in the position of the stationary object within the terrain-mapping FOV and a depth of the stationary object from the AR device 1000, a terrain-mapping engine 1028 executing on the processing units 1020 AR might calculate changes in the orientation of the AR device 1000.

It can be appreciated that these feature-based tracking techniques might be used to monitor changes in the orientation of the AR device 1000 for the purpose of monitoring an orientation of a user's head (e.g., under the presumption that the AR device 1000 is being properly worn by a user 118A). The computed orientation of the AR device 1000 can be utilized in various ways, some of which have been described above.

The processing unit(s) 1020, can represent, for example, a central processing unit ("CPU")-type processor, a graphics processing unit ("GPU")-type processing unit, an FPGA, one or more digital signal processors ("DSPs"), or other hardware logic components that might, in some instances, be driven by a CPU. For example, and without limitation, illustrative types of hardware logic components that can be used include ASICs, Application-Specific Standard Products ("ASSPs"), System-on-a-Chip Systems ("SOCs"), Complex Programmable Logic Devices ("CPLDs"), etc. The controller 1018 can also include one or more computer-readable media 1022, such as the computer-readable media described above. The processing unit(s) 1020 and the computer-readable media 1022 may be coupled to each other and to the optical system 1002 by a bus 1030.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should be also be appreciated that many variations and modifications may be made to the above-described examples, the elements of which are to be understood as being among other acceptable examples. All such modifications and variations are intended to be included herein within the scope of this disclosure and protected by the following claims.

EXAMPLE CLAUSES

The disclosure presented herein encompasses the subject matter set forth in the following example clauses.

Example 1: A system (104) comprising: one or more data processing units (892); and a computer-readable medium (894) having encoded thereon computer-executable instructions to cause the one or more data processing units (892) to receive sensor data captured by one or more sensors of a computing device (102), the sensor data comprising an image (108) of the real-world environment (109) and mesh data (106) derived from a depth scan, the data captured from a first perspective (103); receive input data indicating a second perspective (203); generate a three-dimensional representation of the real-world environment (109) from the image (108) and the mesh data (106); and render the image (108) in a user interface (UI) (118) from the second perspective (203) by rendering the three-dimensional representation of the real-world environment from the second perspective (203).

Example 2: A system of example 1, wherein the instructions further cause the one or more data processing units to: receive a past image (508) and past mesh data (506) captured before the image (108) and the mesh data (106) were captured; and integrate the past image (508) and past mesh data (506) into the 3D representation.

Example 3: A system of example 1, wherein the instructions further cause the one or more data processing units to: receive a second image (608) and second mesh data (606) captured by a second camera (610); and integrate the second image (608) and second mesh data (606) into the 3D representation.

Example 4: A system of example 1, wherein the three-dimensional representation is rendered onto at least two displays, one as a floor-map (402) and one based on the second perspective (203).

Example 5: A system of example 1, wherein a rendering of the three-dimensional representation includes a virtual camera (404, 612) indicating a second perspective (203) of the real-world environment (109).

Example 6: A system of example 5, wherein moving the virtual camera (612) within the real-world environment (109) changes the perspective of another computing device rendering the second perspective (203) of the real-world environment (109).

Example 7: A system of example 5, wherein changing the perspective of another computing device (302) rendering the second perspective (203) of the real-world environment (109) changes the location or orientation of the virtual camera (612).

Example 8: A system (104) comprising: one or more data processing units (892); and a computer-readable medium (894) having encoded thereon computer-executable instructions to cause the one or more data processing units (892) to receive sensor data captured by one or more sensors of a computing device (102), the sensor data comprising an image (108) of the real-world environment (109) and mesh data (106) derived from a depth scan, the data captured from a first perspective (103); receive input data indicating a second perspective (203); generate a three-dimensional representation of the real-world environment (109) from the image (108) and the mesh data (106); receive a past image (508) and past mesh data (506) captured before the image (108) and the mesh data (106) were captured; integrate the past image (508) and past mesh data (506) into the 3D representation; and render the image (108) in a user interface (UI) (118) from the second perspective (203) by rendering the three-dimensional representation of the real-world environment from the second perspective (203).

Example 9: The system of example 8, wherein rendering the image (108) in the UI (118) is part of a meeting, and wherein the past image (508) and past mesh data (506) were captured using the computing device (102) earlier in the meeting.

Example 10: A system of example 8, wherein the instructions further cause the one or more data processing units to: receive a second image (608) and second mesh data (606) captured by a second camera 610; and integrate the second image (608) and second mesh data (606) into the 3D representation.

Example 11: A system of example 8, wherein the three-dimensional representation is rendered onto at least two displays, one as a floor-map (402) and one based on the second perspective (203).

Example 12: A system of example 8, wherein a rendering of the three-dimensional representation includes a virtual camera (404, 612) indicating a second perspective (203) of the real-world environment (109).

Example 13: A system of example 12, wherein moving the virtual camera (612) within the real-world environment (109) changes the perspective of another computing device rendering the second perspective (203) of the real-world environment (109).

Example 14: A system of example 12, wherein changing the perspective of another computing device (302) rendering the second perspective (203) of the real-world environment (109) changes the location or orientation of the virtual camera (612).

Example 15: A method employed by a computing device (104) comprising: receiving sensor data captured by one or more sensors of a computing device (102), the sensor data comprising an image (108) of the real-world environment (109) and mesh data (106) derived from a depth scan, the data captured from a first perspective (103); receiving input data indicating a second perspective (203); generating a three-dimensional (3D) representation of the real-world environment (109) from the image (108) and the mesh data (106); receiving a second image (608) and second mesh data (606) captured by a second camera (610); integrating the second image (608) and second mesh data (606) into the 3D representation; and rendering the image (108) in a user interface (UI) (118) from the second perspective (203) by rendering the three-dimensional representation of the real-world environment from the second perspective (203).

Example 16: The method of example 15, wherein the second camera (610) is included in the image (108), wherein a position of the second camera (610) is known, wherein a past image (508) and past mesh data (506) associated with the position of the second camera (610), when the second camera (610) was not present, is available, further comprising: integrating a portion of the past image (508) that includes the position of the second camera (610) and a portion of the past mesh data (506) that includes the position of the second camera (610) into the three-dimensional representation, so that the rendering of the three-dimensional representation does not include the second camera (610).

Example 17: The method of example 15, wherein the three-dimensional representation is rendered from two perspectives, and wherein a user (119B) is enabled to switch between the two perspectives.

Example 18: The method of example 15, wherein a rendering of the three-dimensional representation includes a virtual camera (404, 612) indicating a second perspective (203) of the real-world environment (109).

Example 19: The method of example 18, wherein the virtual camera (404, 612) is positioned in response to receiving a command from a user (119B), wherein the perspective (203) is updated in real-time as the user positions the virtual camera (404, 612), and wherein rendering the image (108) continues while the second perspective (203) is updated.

Example 20: The method of example 15, wherein images (108) and mesh data (106) are saved over time, and wherein in response to a user command, the UI (118) may display a rendering of the 3D representation from the past from a different perspective.

Among many other technical benefits, the technologies herein enable more efficient use of computing resources such as processor cycles, memory, network bandwidth, and power, as compared to previous solutions relying upon inefficient manual placement of virtual objects in a 3D environment. Other technical benefits not specifically mentioned herein can also be realized through implementations of the disclosed subject matter.

Although the techniques have been described in language specific to structural features and/or methodological acts, it is to be understood that the appended claims are not necessarily limited to the features or acts described. Rather, the features and acts are described as example implementations of such techniques.

What is claimed is:

1. A system comprising:
   one or more data processing units; and
   a computer-readable medium having encoded thereon computer-executable instructions to cause the one or more data processing units to:
      receive real-time sensor data captured by one or more sensors of a first computing device located in a real-world environment, the real-time sensor data comprising an image of the real-world environment and mesh data derived from a depth scan of the real-world environment, the real-time sensor data captured from a first perspective of the one or more sensors;
      receive input data from a user of a second computing device indicating a user-selected second perspective of the same real-world environment that is different from the first perspective;
      generate a three-dimensional (3D) representation of the real-world environment from the real-time sensor data; and
      transmit data changes in a position and an orientation of the one or more sensors without transmitting additional mesh data from a new perspective to the second computing device that causes the second computing device to render the 3D representation of the real-world environment in a user interface (UI) from the second perspective by temporarily using existing mesh data that is stale; and
      after transmission of the changes in the position and the orientation of the one or more sensors, transmit the additional mesh data from the new perspective to the second computing device that causes the second computing device to update the 3D representation of the real-world environment with the additional mesh data.

2. A system of claim 1, wherein the instructions further cause the one or more data processing units to:
   identify the real-world environment based on the mesh data;
   based on identification of the real-world environment, obtain past sensor data captured in the real-world environment at a time point in the past; and
   augment the 3D representation of the real-world environment with the past sensor data so that the 3D representation of the real-world environment rendered in the UI of the second computing device is created from both the real-time sensor data and the past sensor data.

3. A system of claim 1, wherein the instructions further cause the one or more data processing units to:
   receive a second image and second mesh data captured by a second camera; and
   integrate the second image and second mesh data into the 3D representation of the real-world environment.

4. A system of claim 1, wherein a first view of the 3D representation of the real-world environment is rendered on a first display as a floor-map and a second view of the 3D representation of the real-world environment is rendered on a second display based on the second perspective.

5. A system of claim 4, wherein the floor-map includes a representation of a virtual camera indicating the second perspective that is rendered on the second display.

6. A system of claim 5, wherein data received from the second computing device indicating movement of the representation of the virtual camera within the floor-map causes the system to change the second perspective of the 3D representation of the real-world environment that is rendered on the second computing device.

7. A system of claim 5, wherein changing the perspective of the second computing device rendering the perspective of the real-world environment generates data that causes the system to change the location or orientation of the representation of the virtual camera in the floor-map.

8. A system of claim 1, wherein the input data from the user of the second computing device indicating the user-selected second perspective of the same real-world environment that is different from the first perspective comprises an instruction to set the perspective of the second computing device to a then current perspective of the first computing device and not update the perspective of the second computing device as the perspective of the first computing device changes for a set amount of time after which the perspective of the second user device reverts to a real-time perspective of the first computing device.

9. A system of claim 1, wherein computer-executable instructions further cause the one or more data processing units to:
   receive a selection of a target object in the real-world environment;
   determine that the target object has moved; and
   modify the second perspective of the real-world environment that is different from the first perspective to maintain the target object in view.

10. A computing device comprising:
    one or more data processing units; and
    a computer-readable medium having encoded thereon computer-executable instructions to cause the one or more data processing units to:
       receive real-time sensor data captured by one or more sensors located in a real-world environment, the real-time sensor data comprising an image of the real-world environment and mesh data derived from a depth scan of the real-world environment, the real-time sensor data captured from a first perspective;
       receive input data indicating a user-selected second perspective of the real-world environment that is different from the first perspective;
       identify the real-world environment based on location and size of objects in the real-world environment that do not move as represented in the mesh data;
       based on identification of the real-world environment, obtain past sensor data of the real-world environment captured at a time point in the past;

combine the past sensor data with the real-time sensor data to create a 3D representation of the real-world environment that contains more data than the real-time sensor data alone; and render the 3D representation of the real-world environment in a user interface (UI) from the second perspective, wherein the 3D representation of the real-world environment is rendered on a first display as a floor-map and a second view of the 3D representation of the real-world environment is rendered on a second display based on the second perspective and wherein the floor-map includes a representation of a virtual camera, an orientation of the virtual camera indicating the second perspective that is rendered on the second display.

11. The computing device of claim 10, wherein the real-time sensor data is captured during a meeting and the past sensor data was captured using the one or more sensors earlier in the meeting.

12. A computing device of claim 10, wherein the instructions further cause the one or more data processing units to:

receive a second image and second mesh data captured by a second camera; and integrate the second image and second mesh data into the 3D representation.

13. The computing device of claim 10, wherein identify the real-world environment based on the mesh data comprises identify the real-world environment based on location and size of walls and location and size of windows in the mesh data.

14. A method employed by a computing device comprising:

receiving real-time sensor data captured by a first set of one or more sensors located in a real-world environment, the real-time sensor data comprising a first image of the real-world environment and a first mesh data derived from a depth scan of the real-world environment, the real-time sensor data captured from a first perspective of the first set of one or more sensors;

receiving input data indicating a second perspective that is different from the first perspective;

generating a three-dimensional (3D) representation of the real-world environment from the real-time sensor data;

receiving a second image of the real-world environment and second mesh data derived from a second depth scan of the real-world environment captured by a second set of one or more sensors, the second set of one or more sensors located at a separate physical location in the real-world environment than the first set of one or more sensors;

augmenting the 3D representation of the real-world environment with the second image and the second mesh data;

integrating, into the 3D representation, at least portions of past image and past mesh data that includes the portion of the real-world environment occupied by the second set of one or more sensors that were captured at a previous time when the second set of one or more sensors was not present; and rendering the 3D representation of the real-world environment in a user interface (UI) from the second perspective that includes the portion of the real-world environment occupied by the second set of one or more sensors using the past image and past mesh data so that the 3D representation of the real-world environment does not include the second set of one or more sensors, wherein a rendering of the 3D representation of the real-world environment includes a representation of a virtual camera indicating a perspective of the real-world environment.

15. The method of claim 14, wherein the 3D representation is rendered from two perspectives, and wherein rendering the 3D representation of the real-world environment comprises rendering both of the two perspectives.

16. The method of claim 14, further comprising receiving a command indicating a position of the virtual camera; and updating the second perspective in real-time based on the position of the virtual camera, and wherein rendering the 3D representation of the real-world environment continues while the perspective is updated.

17. The method of claim 14, wherein the real-time sensor data are saved over time, and wherein the method further comprises rendering, from a third perspective, a past 3D representation of the real-world environment from real-time sensor data collected at a time point in the past.

* * * * *